(12) United States Patent
Tsukada

(10) Patent No.: US 6,903,847 B2
(45) Date of Patent: Jun. 7, 2005

(54) IMAGE READING APPARATUS

(75) Inventor: Koji Tsukada, Osaka (JP)

(73) Assignee: Minolta Co., Ltd., Osaka (JP)

( * ) Notice: Subject to any disclaimer, the term of this patent is extended or adjusted under 35 U.S.C. 154(b) by 1032 days.

(21) Appl. No.: 09/781,197

(22) Filed: Feb. 13, 2001

(65) Prior Publication Data

US 2001/0013955 A1 Aug. 16, 2001

(30) Foreign Application Priority Data

Feb. 14, 2000 (JP) ........................................ 2000-035038

(51) Int. Cl.[7] .............................................. H04M 1/04
(52) U.S. Cl. ........................ 358/474; 358/468; 358/482; 358/448
(58) Field of Search ................................ 358/474, 468, 358/482, 483, 448, 505, 513, 425, 426.01, 443, 446

(56) References Cited

U.S. PATENT DOCUMENTS 5,014,137 A * 5/1991 Shimada ...................... 358/410
5,742,406 A * 4/1998 Suzuki ......................... 358/468
6,473,110 B1 * 10/2002 Matsuo ........................ 347/235
6,757,084 B2 * 6/2004 Kurita et al. ................. 358/509

FOREIGN PATENT DOCUMENTS

| JP | 7-322130 | 12/1995 |
| JP | 9-23309 | 1/1997 |
| JP | 9-139819 | 5/1997 |
| JP | 9-200454 | 7/1997 |
| JP | 10-290399 | 10/1998 |

* cited by examiner

Primary Examiner—Kimberly Williams
Assistant Examiner—Negussie Worku
(74) Attorney, Agent, or Firm—Morrison & Foerster LLP

(57) ABSTRACT

An image reading apparatus according to the present invention allows the period of generation of a load signal NRD, the load value in counter circuits 21 and 31, and the comparative value in pulse generator circuits 22 and 32 to be changed corresponding to the multiplication rate of a PLL circuit 14. Accordingly, the pulse width and the phase length of the signals generated in signal generator circuits 12A and 12B are enhanced in the controllable accuracy by increasing the multiplication rate of the PLL circuit 14. Hence, even if the driving frequency is lowered, the pulse width and the phase length of the signals generated in signal generator circuits 12A and 12B can favorably be maintained in the controllable accuracy.

13 Claims, 29 Drawing Sheets

FIG. 6

RELATIONSHIP BETWEEN PHASE SETTING AND LOAD VALUE SETTING

| PHASE LENGTH | LOAD VALUE |
|---|---|
| LENGTH OF 0/8~1/8 THE PERIOD<br>LENGTH OF 0/12~1/12 THE PERIOD<br>LENGTH OF 0/16~1/16 THE PERIOD | 0 |
| LENGTH OF 2/16~3/16 THE PERIOD | 7 |
| LENGTH OF 4/16~5/16 THE PERIOD | 6 |
| LENGTH OF 2/12~3/12 THE PERIOD<br>LENGTH OF 6/16~7/16 THE PERIOD | 5 |
| LENGTH OF 4/12~5/12 THE PERIOD<br>LENGTH OF 8/16~9/16 THE PERIOD | 4 |
| LENGTH OF 2/8~3/8 THE PERIOD<br>LENGTH OF 6/12~7/12 THE PERIOD<br>LENGTH OF 10/16~11/16 THE PERIOD | 3 |
| LENGTH OF 4/8~5/8 THE PERIOD<br>LENGTH OF 8/12~9/12 THE PERIOD<br>LENGTH OF 12/16~13/16 THE PERIOD | 2 |
| LENGTH OF 6/8~7/8 THE PERIOD<br>LENGTH OF 10/12~11/12 THE PERIOD<br>LENGTH OF 14/16~15/16 THE PERIOD | 1 |

FIG. 7

RELATIONSHIP BETWEEN PULSE WIDTH SETTING AND COMPARATIVE VALUE SETTING

| PULSE WIDTH | COMPARATIVE VALUE |
|---|---|
| WIDTH OF 2/8~3/8 THE PERIOD<br>WIDTH OF 2/12~3/12 THE PERIOD<br>WIDTH OF 2/16~3/16 THE PERIOD | 1 |
| WIDTH OF 4/8~5/8 THE PERIOD<br>WIDTH OF 4/12~5/12 THE PERIOD<br>WIDTH OF 4/16~5/16 THE PERIOD | 2 |
| WIDTH OF 6/8~7/8 THE PERIOD<br>WIDTH OF 6/12~7/12 THE PERIOD<br>WIDTH OF 6/16~7/16 THE PERIOD | 3 |
| WIDTH OF 8/12~9/12 THE PERIOD<br>WIDTH OF 8/16~9/16 THE PERIOD | 4 |
| WIDTH OF 10/12~11/12 THE PERIOD<br>WIDTH OF 10/16~11/16 THE PERIOD | 5 |
| WIDTH OF 12/16~13/16 THE PERIOD | 6 |
| WIDTH OF 12/16~15/16 THE PERIOD | 7 |

FIG. 20  PRIOR ART

RELATIONSHIP BETWEEN PHASE SETTING AND LOAD VALUE SETTING

| PHASE LENGTH | LOAD VALUE |
|---|---|
| LENGTH OF 0/8~1/8 THE PERIOD | 0 |
| LENGTH OF 2/8~3/8 THE PERIOD | 3 |
| LENGTH OF 4/8~5/8 THE PERIOD | 2 |
| LENGTH OF 6/8~7/8 THE PERIOD | 1 |

FIG. 21  PRIOR ART

RELATIONSHIP BETWEEN PULSE WIDTH SETTING AND COMPARATIVE VALUE SETTING

| PULSE WIDTH | COMPARATIVE VALUE |
|---|---|
| WIDTH OF 2/8~3/8 THE PERIOD | 1 |
| WIDTH OF 4/8~5/8 THE PERIOD | 2 |
| WIDTH OF 6/8~7/8 THE PERIOD | 3 |

IMAGE READING APPARATUS

This application is based on application No. 2000-35038 filed in Japan, the contents of which is hereby incorporated by reference.

BACKGROUND OF THE INVENTION

1. Field of the Invention

The present invention relates to an image reading apparatus for optically scanning an original to read image data. More particularly, it relates to an image reading apparatus for used in a digital copying machine or scanner or the like.

2. Description of Related Art

A Conventional image reading apparatus is designed for optoelectrically converting a reflected light on an original into an analog image signal with the use of a linear image sensor such as a CCD. The analog image signal is then converted by an A/D converter into a digital image signal which is subjected to relevant image processing. Such a conventional image reading apparatus is schematically shown in FIG. 16. The image reading apparatus comprises a CCD sensor 101, sample hold circuits 102, amplifier circuits 103, A/D converter circuits 104, a channel mixer circuit 105, a timing signal generator circuit 106, and a phase control circuit 107. While the CCD sensor 101 is of an odd/even (pixel) simultaneously parallel output type, the sample hold circuits 102, the amplifier circuits 103, and the A/D converter circuits 104 are paired for handling odd pixels and even pixels.

The CCD sensor 101 is a solid-state imaging device driven with a combination of transfer clock signal TR, reset pulse signal RS, and shift pulse signal SF. The timing signal generator circuit 106 generates and distributes to each circuit a variety of signals which are different in the pulse width and the phase length, including the transfer clock signal TR, the shift pulse signal SF, the reset pulse signal RS, a sample-hold pulse signal SH, an A/D clock signal AD, and a pixel clock signal PE. The sample-hold circuit 102 is responsive to a signal output duration of the CCD sensor 101 for sampling and holding the analog image signal of a stable period in synchronization with each trailing edge of a sample-hold pulse signal SH. The channel mixer circuit 105 combines the odd and even outputs of the two A/D converter circuits 104 and releases as a image data in synchronization with each leading edge of the pixel clock signal PE. The phase control circuit 107 finely adjusts (in nanoseconds) the phase length of both the reset pulse signal RS and the sample-hold pulse signal SH generated by the timing signal generator circuit 106.

FIG. 17 is a block diagram of the timing signal generator circuit 106. The timing signal generator circuit 106 comprises a main counter circuit 111, a pair of signal generator circuits 112A, another pair of signal generator circuits 112B, and a delay circuit 113. The main counter circuit 111 generates the pixel clock signal PE, a pulse signal PL, two stop signals TST and RST for negating the output of the transfer clock signal TR and the reset pulse signal RS respectively, and a load signal RD which is released whenever the target pixel in the CCD sensor 101 is changed based on an input clock signal EN inputted as the reference clock signal.

The signal generator circuit 112A is responsive to the input clock signal EN and the load signal RD for generating and releasing the signal which has a desired pulse width and a desired phase length. The signal generator circuit 112A comprises, as shown in FIG. 18, a counter circuit 121, a pulse generator circuit 122, a delay circuit 123A, a delay circuit 123B, a delay circuit 123C, an OR gate 124, and a NOT gate 125. When one period is determined for reading CCD pixels, the pulse width and phase length of generated signals may be selected from $2/8$ to $7/8$ the period and from $0/8$ to $7/8$ the period respectively based on $1/8$ the period between the leading edge and the trailing edge of a pulse of the input clock signal EN, as shown in FIG. 19. More specifically, the output signal shown in FIG. 19 has a pulse width of $3/8$ the period and a phase length of $3/8$ the period.

The counter circuit 121 is responsive to the load signal RD from the main counter circuit 111 for outputting a load value of the load signal RD corresponding to the phase setting determined from a table shown in FIG. 20 delaying by one cycle of the input clock signal EN. Otherwise, the counter circuit 121 continues counting up until the load signal is received again.

The pulse generator circuit 122 compares between the output of the counter circuit 121 and its comparative value corresponding to the pulse width setting based on a table shown in FIG. 21. When the output of the counter circuit 121 is smaller than the comparative value, the output signal is released at "H" level. Otherwise, the output signal is released at "L" level. Meanwhile, the output signal is delayed by two cycles of the input clock signal EN.

The delay circuit 123C delays the output of the pulse generator circuit 122 by three cycles of the input clock signal EN so that the pipeline delay number of the signal generator circuit 112A is equal to eight cycles of the input clock signal EN.

The delay circuit 123A is synchronized with the leading edge of the input clock signal EN and when n is an even number at the phase length of n/8 the period, outputs its input signal delaying by two cycles of the input clock signal EN. When n is an odd number at the phase length of n/8 the period and m is an odd number at the pulse width of m/8 the period, the delay circuit 123A outputs its input signal delaying by three cycles of the input clock signal EN. Otherwise, the output signal is released at "L" level.

The delay circuit 123B is synchronized with the trailing edge of the input clock signal EN and when n is an odd number at the phase length of n/8 the period, outputs its input signal delaying by 2.5 cycles of the input clock signal EN. Otherwise, the output signal is released at "L" level.

FIG. 22 is a block diagram of the signal generator circuit 112B. The signal generator circuit 112B comprises a counter circuit 131, a pulse generator circuit 132, a delay circuit 133A, a delay circuit 133B, a delay circuit 133C, an OR gate 124, a NOT gate 125, a delay circuit 133D, and a selector 137. The three delay circuits 133A, 133B, and 133C are identical to the three delay circuits 123A, 123B, and 123C in the signal generator circuit 112A. In other words, the signal generator circuit 112B is equal to the signal generator circuit 112A plus the delay circuit 133D and the selector 137. The signal generator circuit 112B is responsive to the input clock signal EN, the load signal RD, and the stop signal TST or RST for generating and releasing the signal which has a desired pulse width and a desired phase length and has been stopped outputting for a predetermined signal stop period.

The delay circuit 133D outputs the stop signal TST or RST delaying by two cycles of the input clock signal EN so that the pipeline delay number before the signal is negated at the outside should be equal to eight cycles of the input clock signal EN with reference to counts by the main counter for the CCD sensor.

The selector 137 selects and passes a stop-interval signal STT (may be at either "H" or "L" level and in this example, set to "L" level) when the output of the delay circuit 133D is at "H" level. When the output of the delay circuit 133D is at "L" level, the selector 137 selects and passes the output signal of the delay circuit 133C.

The action of the image reading apparatus having the foregoing arrangement will now be explained. The CCD sensor 101 is entirely driven according to the timing chart shown in FIG. 23. More particularly, when the shift pulse signal SF is turned to "H" level, the charge accumulated in photodiodes in the CCD sensor 101 is entirely transferred on a line-by-line basis to two, odd and even, analog shift registers. As timed with the transfer clock signal TR, the charge is parallelly transferred on a pixel-by-pixel basis to corresponding floating capacitors of the output portion. The potential difference between the capacitors is then amplified and released as the output signal from the CCD sensor 101. The potential difference can be initialized when the reset pulse signal RS is turned to "H" level before the succeeding pixel reading. While the shift pulse signal SF is at "H" level, both the transfer clock signal TR and the reset pulse signal RS remain negated for preventing the generation of noise.

The output signal released from the CCD sensor 101 is then sampled and held in the sample-hold circuit 102 at the timing of a sample-hold pulse SH as shown in FIG. 24. The output signal of the sample-hold circuit 102 is then amplified by the amplifier circuit 103 and converted at the timing of an A/D clock signal AD to a digital signal in the A/D converter circuit 104. The two, odd and even, digital signals are combined at the timing of the pixel clock signal PE in the channel mixer circuit 105. A resultant composite signal is then released from the channel mixer circuit 105 as the read image data.

The actions of the main counter circuit 111, the signal generator circuit 112A, and the signal generator circuit 112B for generating the various signals are also explained. It is assumed that the read image data is processed at 40 MHz. The action of the main counter circuit 111 is first explained referring to FIG. 25. The main counter circuit 111 receives the input clock signal EN as a reference clock signal. The input clock signal EN is frequency divided to form the pixel clock signal PE. Also, the pulse signal PL, the transfer clock stop signal TST, and the reset pulse stop signal RST are generated on the pixel-by-pixel basis from the CCD sensor 101. Upon the target pixel in the CCD sensor 101 being changed, the load signal RD is generated. The output signal of the main counter indicates the position of pixels in the image data at the timing of the pixel clock signal PE. The output signal of the main counter for the CCD sensor is equivalent to the output of the main counter from which the least significant bit is omitted.

The pulse signal PL, the transfer clock stop signal TST, and the reset pulse stop signal RST are then delayed by one CCD pixel (four cycles of the input clock signal EN) from the predetermined position (at 2 shown in FIG. 25) on the main counter for the CCD sensor. The pulse signal PL is further delayed by one CCD pixel in the delay circuit 113 and released as the shift pulse signal SF. The delay by one CCD pixel is necessary for synchronization with the other signals at the same pipeline delay number.

The pipeline delay number before the output signal is released out from the main counter circuit 111 is held to two CCD pixels (four cycles of the pixel clock signal=eight cycles of the input clock signal) for each signal by the action of the two signal generator circuits 112A and 112B. This ensures the synchronization between the output signal of the CCD sensor 101 and the read image data.

The actions of the signal generator circuits 112A and 112B are now explained. Assuming that the pulse width is m/8 the period and the phase length is n/8 the period, the action of the signal generator circuit 112A first is classified into four modes depending on the even and odd of m and n. FIGS. 26 to 29 illustrate timing charts of the four modes of the action of the signal generator circuit 112A. FIG. 26 is the timing chart of the signal generator circuit 112A where the pulse width is 4/8 the period (m being an even number) and the phase length is zero the period(n being an even number). FIG. 27 is the timing chart of the signal generator circuit 112A where the pulse width is 3/8 the period (m being an odd number) and the phase length is zero the period(n being an even number). FIG. 28 is the timing chart of the signal generator circuit 112A where the pulse width is 6/8 the period (m being an even number) and the phase length is 3/8 the period (n being an odd number). FIG. 29 is the timing chart of the signal generator circuit 112A where the pulse width is 3/8 the period (m being an odd number) and the phase length is 3/8 the period (n being an odd number).

As apparent from FIGS. 26 to 29, the signal generator circuit 112A generates the signal which has a desired pulse width and a desired phase length and is delayed by two CCD pixels (eight cycles of the input clock signal). It is now assumed for detailed description of the action of the signal generator circuit 112A that the pulse width is 4/8 the period and the phase length is zero the period as shown in FIG. 26.

Based on the table of FIG. 20, as the phase length is zero the period, the load value is "0". The output signal of the counter circuit 121 is thus equivalent to the count data "0" delayed by one cycle of the input clock signal EN. And, based on the table of FIG. 21, as the pulse width is 4/8 the period, the comparative value is "2". Accordingly, the pulse generator circuit 122 releases the signal which is at "H" level when the output of the counter circuit 121 is smaller (namely 0 or 1) than the comparative value "2" and has been delayed by two cycles of the input clock signal EN.

The output signal of the pulse generator circuit 122 is delayed again by three cycles of the input clock signal EN in the delay circuit 123C. The output signal of the delay circuit 123C is further delayed by two cycles of the input clock signal EN in the delay circuit 123A. Meanwhile, as the phase length is zero the period, the output signal of the delay circuit 123B remains at "L" level. The OR gate 124 finally determines the state of the output signal of the signal generator circuit 112A from the two output signals of the delay circuits 123A and 123B. The output signal of the signal generator circuit 112A has a pulse width of 4/8 the period and a phase length of zero the period as having been delayed by two CCD pixels (eight cycles of the input clock signal EN).

The action of the signal generator circuit 112B is now explained. The action of the signal generator circuit 112B like the signal generator circuit 112A is also classified into four modes depending on the even and odd of m and n at the pulse width of m/8 the period and the phase length of n/8 period. It is hence assumed for detailed description of the action of the signal generator circuit 112B that the pulse width is 3/8 the period (m being an odd number) and the phase length is 3/8 the period (n being an odd number) as shown in FIG. 30.

Based on the table of FIG. 20, as the phase length is 3/8 the period, the load value is "3". The output signal of the counter circuit 131 is thus equivalent to the count data "3" delayed by one cycle of the input clock signal EN. And, based on the table of FIG. 21, as the pulse width is ⅜ the period, the comparative value is "1". Accordingly, the pulse generator circuit 132 releases the signal which is at "H" level when the output of the counter circuit 131 is smaller (namely 0) than the comparative value "1" and has been delayed by two cycles of the input clock signal EN.

The output signal of the pulse generator circuit 132 is delayed again by three cycles of the input clock signal EN in the delay circuit 133C. The output signal of the delay circuit 133C is transferred to the selector 137. Meanwhile, the stop signal TST or RST is delayed by two cycles of the input clock signal EN in the delay circuit 133D and then transmitted to the selector 137. The selector 137 selects and passes the stop-interval signal STT (held at "L" level in this example) when the output signal of the delay circuit 133D is at "H" level. When the output signal is "L" level, the selector 137 selects and passes the output signal of the delay circuit 133C.

The output signal of the selector 137 is received by the delay circuit 133A. As both m and n are odd numbers at the pulse width of m/8 and the phase length of n/8, the output signal of the selector 137 is delayed by three cycles of the input clock signal EN in the delay circuit 133A. The output signal of the selector 137 is also received by the delay circuit 133B. As n is an odd number at the phase length of n/8, the output signal of the selector 137 is delayed by 2.5 cycles of the input clock signal EN in the delay circuit 133B. The OR gate 124 finally determines the state of the output signal of the signal generator circuit 112B from the two output signals of the delay circuits 133A and 133B. The output signal of the signal generator circuit 112B has a pulse width of ⅜ the period and a phase length of ⅜ the period as having been delayed by two CCD pixels (eight cycles of the input clock signal EN).

However, the conventional image reading apparatus has a disadvantage that its model suited for a high-speed machine can hardly be applied to a low or middle speed machine. This may be explained by the fact that when the driving frequency is lowered, the pulse width and phase length of the control signals generated by the signal generator circuits 112A and 112B can hardly be maintained in the controllable accuracy.

For example, if the read image data is processed at 40 MHz, the CCD sensor 101 is driven at a rate of 20 MHz per pixel and its period is 50 ns. The smallest controlling step of the timing signal is thus 6.25 ns (equal to 50 ns/8). If the read image data is processed at 26.67 MHz, the CCD sensor 101 is driven at a rate of 13.33 MHz per pixel and its period is then 75 ns. The smallest controlling step of the timing signal is thus 9.38 ns (equal to 75 ns/8). As apparent, when the same model suited for the high-speed (40 MHz) machine is applied to the low or medium speed (26.67 MHz) machine, the smallest controlling step of the timing signals generated in the signal generator circuits 112A and 112B becomes greater, hence declining the accuracy of signal timing.

Also, when the period for reading in the CCD sensor 101 is increased (the frequency is lowered), the frequency of the input clock signal is also lowered, hence varying the pulse width and phase length of the timing signals generated in the signal generator circuits 112A and 112B.

SUMMARY OF THE INVENTION

The present invention is developed for eliminating the above disadvantages and its object is to provide an image reading apparatus which can generate control signals, which are desirably determined in the pulse width and the phase length, regardless of the driving frequency of an optoelectric converting means so that the pulse width and the phase length can favorably be maintained in the controllable accuracy.

An image reading apparatus according to the present invention comprises: an optoelectric converter device for converting an optical image into an electric signal at the timing of a control signal and a pulse signal; a pulse signal generator for generating the pulse signal from an input clock signal; a clock signal multiplier for multiplying a clock signal, of which the period corresponds to a period of scanning one pixel on the optoelectric converter device, to generate a multiplied clock signal; a load signal generator for generating a load signal from the multiplied clock signal; a counter for releasing a count data determined by the multiplied clock signal and the load signal; a comparison signal generator for comparing between a pulse width setting of the control signal and the count data to generate a comparison signal; and a control signal generator for generating the control signal from the comparison signal.

In the image reading apparatus, the clock signal multiplier generates a multiplied clock signal from multiplication by n (n being an integer) of the clock signal which corresponds to the period of scanning one period on the optoelectric converter device. The load signal generator generates a load signal from the multiplied clock signal generated by the clock signal multiplier. The counter releases a count data determined by the multiplied clock signal and the load signal. The comparison signal generator compares between a pulse width setting of the pulse signal and the count data from the counter to generate a comparison signal. The control signal generator then generates a control signal from the comparison signal generated by the comparison signal generator. Meanwhile, the pulse signal generator generates a pulse signal from the input clock signal. The optoelectric converter device can thus be driven by the control signal and the pulse signal. As a result, image information is read out as a image data.

The clock signal for generating the control signals is a multiplied clock signal generated by the multiplied clock signal generator in the image reading apparatus of the present invention. This allows the control signal having a desired pulse width and a desired phase length to be generated by modifying the multiplication rate in the multiplied clock signal generator regardless of any input clock signal (the driving frequency) of the optoelectric converter device. Accordingly, the pulse width and phase length of the control signal can favorably be maintained in the controllable accuracy regardless of the driving frequency of the optoelectric converter device.

Another image reading apparatus according to the present invention comprises: a pulse signal generator for generating a pulse signal from an input clock signal; an optoelectric converter device for converting reflected light on an original into an electric signal and releasing it as an analog image signal of pixels at intervals of a period determined by the pulse signal; a clock multiplier for multiplying a clock signal, of which the period corresponds to a period of scanning one pixel on the optoelectric converter device, to generate a multiplied clock signal; a control signal generating means for generating a control signal from the multiplied clock signal; and a signal processor responsive to the control signal for processing the analog image signal released from the optoelectric converter device.

In the image reading apparatus, the pulse signal generator generates a pulse signal from the input clock signal. The optoelectric converter device generates an analog image signal of pixels at intervals of a period determined by the pulse signal. Then, the clock signal multiplier generates a multiplied clock signal from multiplication of a clock signal of which the period corresponds to a period of scanning one pixel on the optoelectric converter device. The control signal generating means generates a control signal from the multiplied clock signal. The control signal is used for processing the analog image signal from the optoelectric converter device.

The control signal for processing the analog image signal from the optoelectric converter device is generated from the multiplied clock signal in the image reading apparatus of the present invention. This allows the control signal to have a desired pulse width and a desired phase length determined by modifying the multiplication rate for generation of the multiplied clock signal regardless of any input clock signal (the driving frequency) of the optoelectric converter device. Accordingly, the pulse width and phase length of the control signal can favorably be maintained in the controllable accuracy regardless of the driving frequency of the optoelectric converter device and the analog image signal released from the optoelectric converter device can be processed at a higher accuracy.

A further image reading apparatus according to the present invention comprises: a CCD sensor; a means for generating from an input clock signal a shift pulse signal for the CCD sensor; a means for multiplying a clock signal, of which the period corresponds to a period of scanning one pixel on the CCD sensor, to generate a multiplied clock signal; a control signal generating means for generating a control signal from the multiplied clock signal; and a signal processing means responsive to the control signal for processing the analog image signal released from the CCD sensor.

In the image reading apparatus, a shift pulse signal which is one of the signals for driving the CCD sensor is generated from the input clock signal. Also, a multiplied clock signal is generated by multiplying a clock signal of which the period corresponds to a period of scanning one pixel on the CCD sensor. The control signal generating means generates a control signal from the multiplied clock signal. The control signal is then used for processing the analog image signal released from the CCD sensor.

The control signal for processing the analog image signal from the CCD sensor is generated from the multiplied clock signal in the image reading apparatus of the present invention. This allows the control signal to have a desired pulse width and a desired phase length determined by modifying the multiplication rate for generation of the multiplied clock signal regardless of any input clock signal (at the driving frequency) of the CCD sensor. Accordingly, the pulse width and phase length of the control signal can favorably be maintained in the controllable accuracy regardless of the driving frequency of the CCD sensor and the analog image signal released from the CCD sensor can be process at a higher accuracy.

BRIEF DESCRIPTION OF THE DRAWINGS

FIG. 6 is an explanatory diagram illustrating the relationship between the phase length and the load value;

FIG. 7 is an explanatory diagram illustrating the relationship between the pulse width and the comparative value;

FIG. 20 is an explanatory diagram illustrating the relationship between the phase length and the load value;

FIG. 21 is an explanatory diagram illustrating the relationship between the pulse width and the comparative value;

DETAILED DESCRIPTION OF THE PREFERRED EMBODIMENTS

An image reading apparatus according to one embodiment of the present invention will be described in more detail referring to the relevant drawings.

Figure 1:
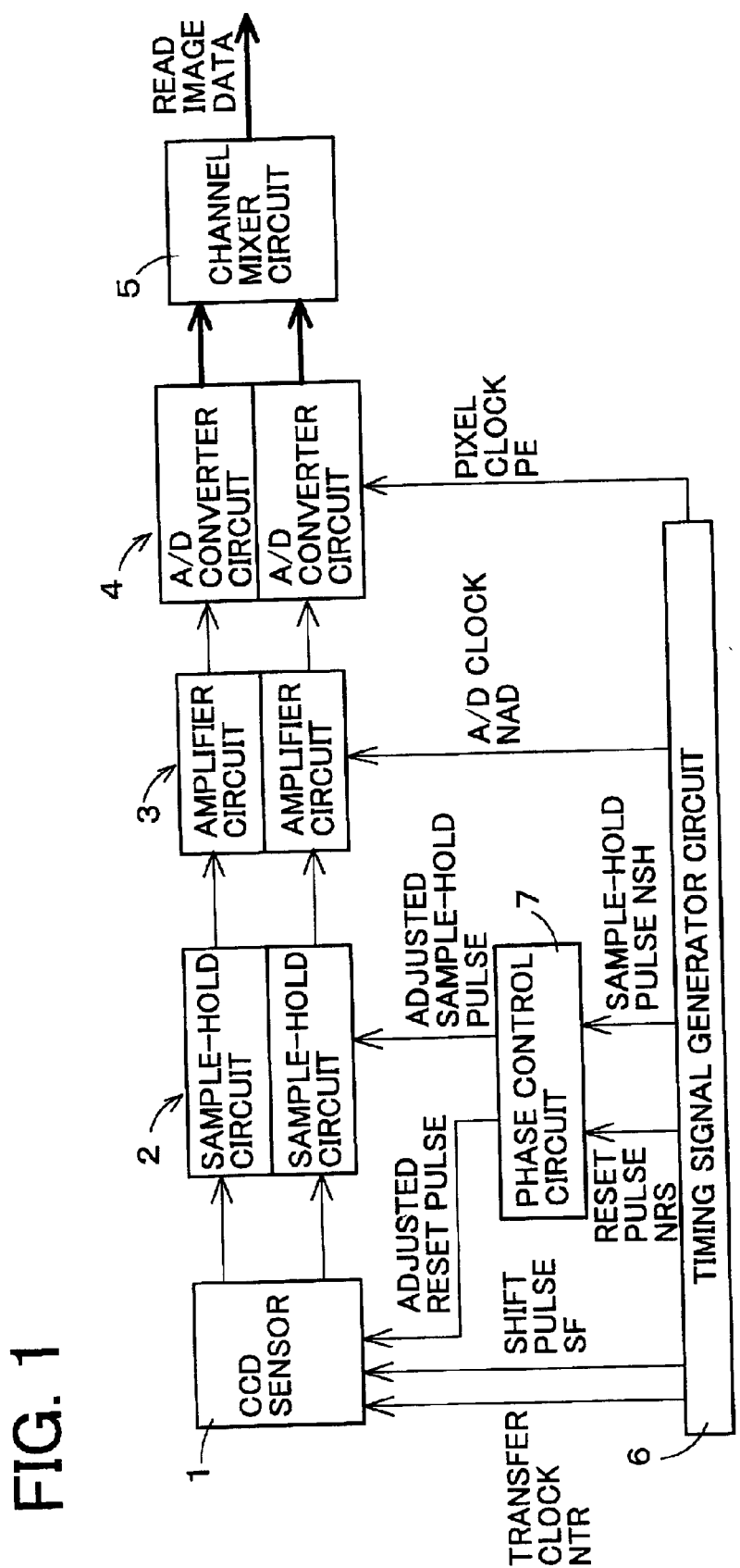
FIG. 1 is a block diagram of a schematic arrangement of an image reading apparatus according to one embodiment of the present invention.

The image reading apparatus of the embodiment like a conventional image reading apparatus comprises, as shown in FIG. 1, a CCD sensor 1, sample-hold circuits 2, amplifier circuits 3, A/D converter circuits 4, a channel mixer circuit 5, a timing signal generator circuit 6, and a phase control circuit 7. While the components are substantially identical to those of the conventional arrangement, the timing signal generator circuit 6 is unique. As the CCD sensor 1 is of a two, odd and even, parallel output type, the sample-hold circuits 2, the amplifier circuits 3, and the A/D converter circuits 4 are paired for handling odd and even signals respectively.

The CCD sensor 1 is a solid-state imaging device which is driven by a combination of transfer clock signal NTR, reset pulse signal NRS, and shift pulse signal SF. The timing signal generator circuit 6 generates and transmits the shift pulse signal SF and a pixel clock signal PE, and also the transfer clock signal NTR, the reset pulse signal NRS, a sample-hold pulse signal NSH, and an A/D clock signal NAD which are arbitrary in pulse width and phase length. The sample-hold circuit 2 is responsive to a signal output duration of the CCD sensor 1 for sampling and holding the analog image signal of a stable period in synchronization with each trailing edge of a the sample-hold pulse signal NSH. The channel mixer circuit 5 combines the odd and even outputs of the two A/D converter circuits 4 and releases as a image data in synchronization with each leading edge of the pixel clock signal PE. The phase control circuit 7 finely adjusts (in nanoseconds) the phase length of both the reset pulse signal NRS and the sample-hold pulse signal NSH generated by the timing signal generator circuit 6.

Figure 2:
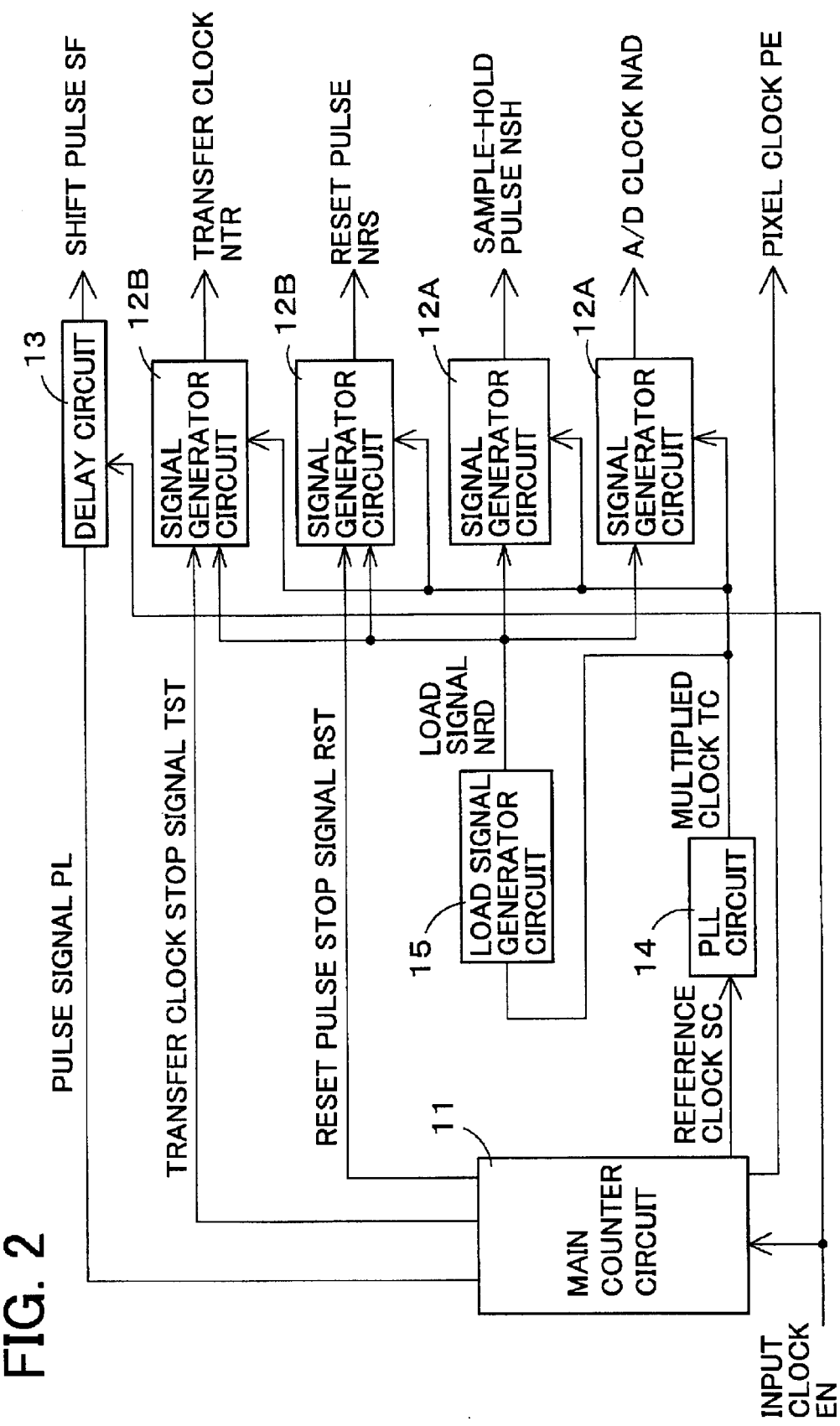
FIG. 2 is a block diagram of a schematic arrangement of the timing signal generator circuit shown in FIG. 1.
Figure 17:
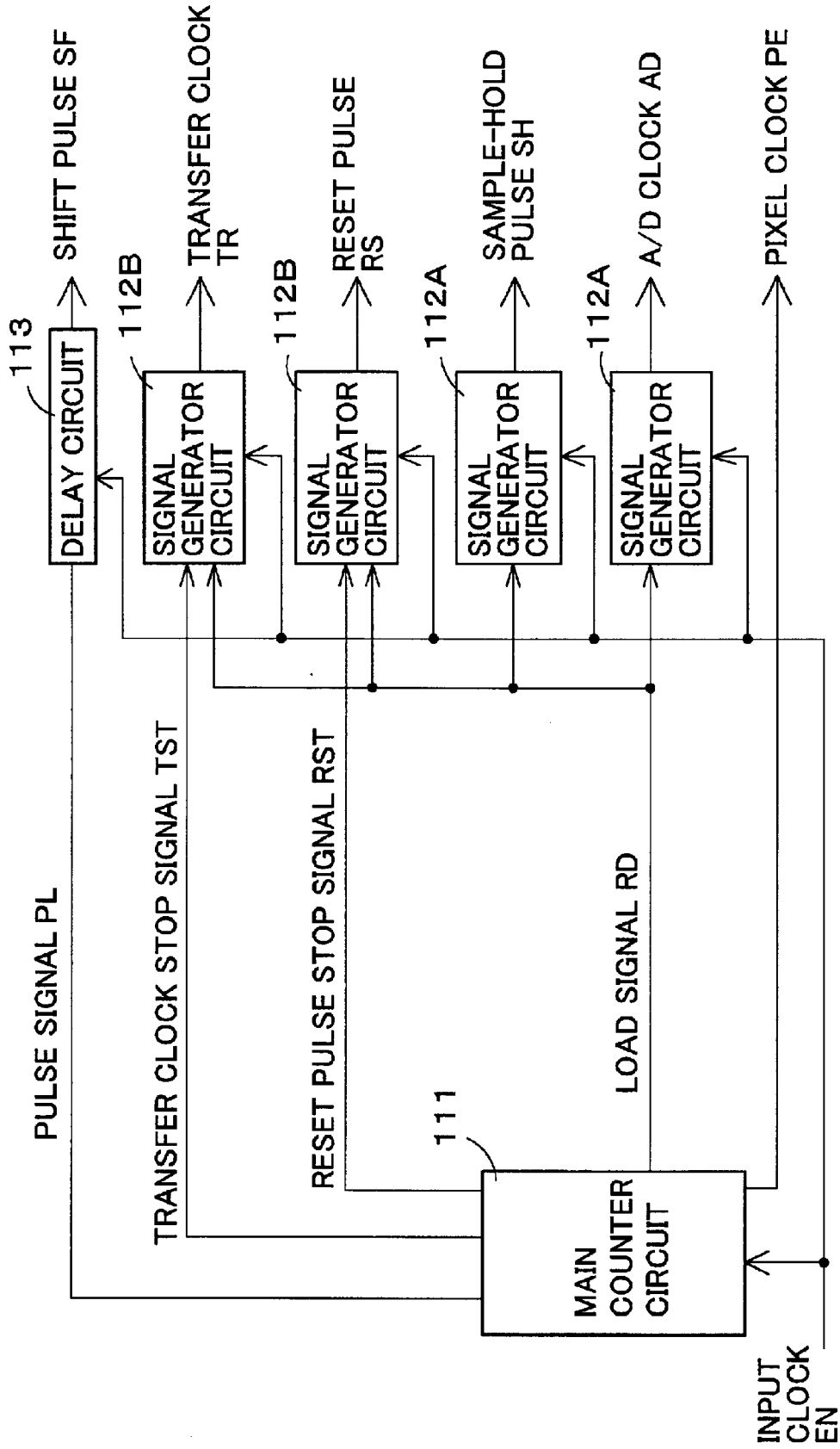
FIG. 17 is a block diagram of a schematic arrangement of the timing signal generator circuit shown in FIG. 16.

FIG. 2 is a block diagram of the timing signal generator circuit 6. The timing signal generator circuit 6 comprises a main counter circuit 11, a pair of signal generator circuits 12A, another pair of signal generator circuits 12B, a delay circuit 13, a PLL circuit 14, and a load signal generator circuit 15. More specifically, the timing signal generator circuit 6 is equivalent to the conventional timing signal generator circuit 106 (FIG. 17) plus the PLL circuit 14 and the load signal generator circuit 15. The signal generator circuits 12A and 12B are also different from those described previously as will be described later in more detail.

The main counter circuit 11 receives an input clock signal EN as the reference clock signal and generates the pixel clock signal PE, the pulse signal PL, two stop signals TST and RST for negating the output of the transfer clock signal TR and the reset pulse signal RS respectively, and a reference clock signal SC which is supplied to the PLL circuit 14.

Figure 3:
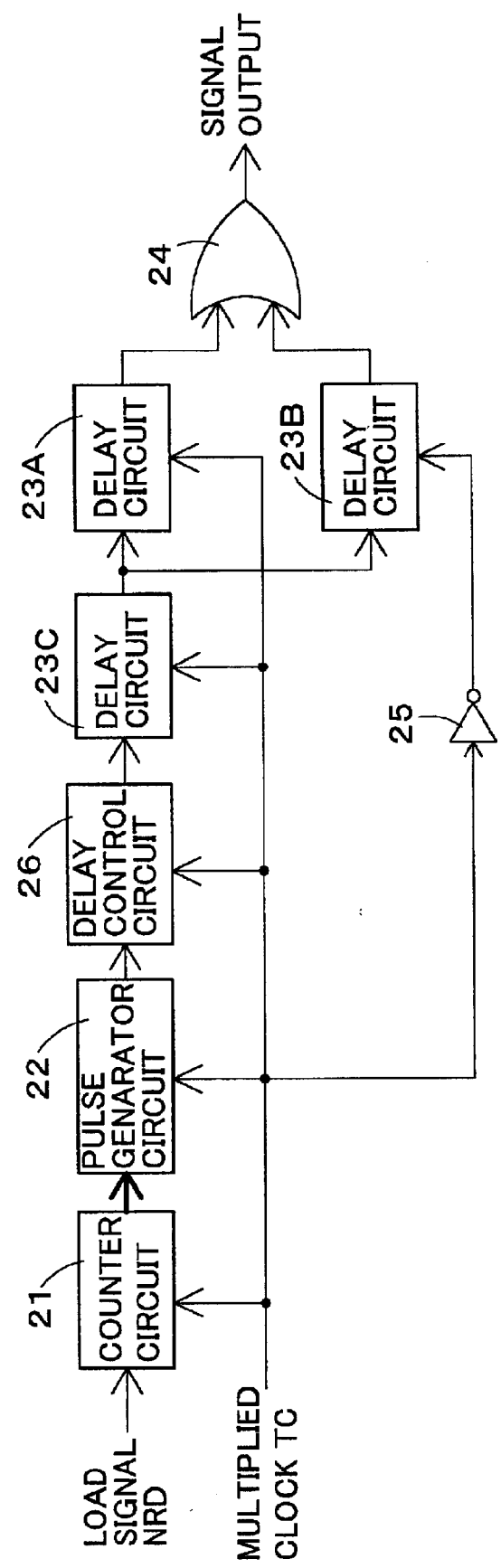
FIG. 3 is a block diagram of a schematic arrangement of the signal generator circuit 12A shown in FIG. 2.
Figure 18:
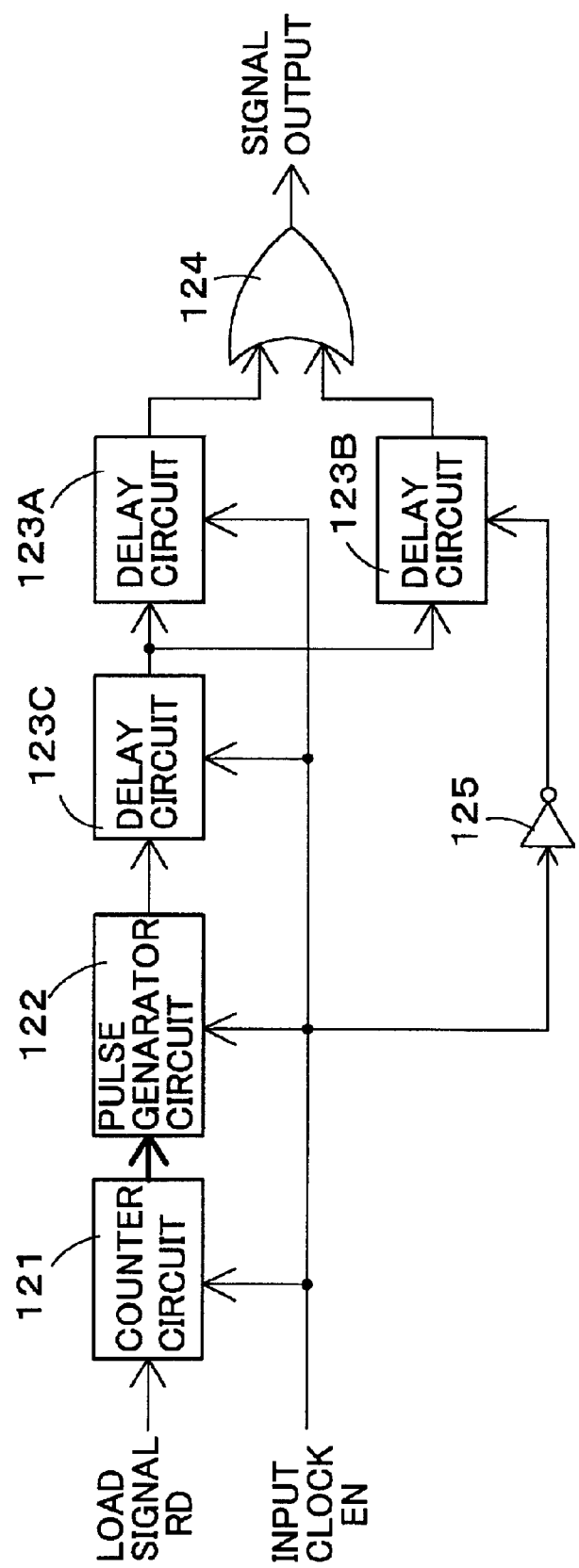
FIG. 18 is a block diagram of a schematic arrangement of the signal generator circuit 112A shown in FIG. 17.
Figure 19:
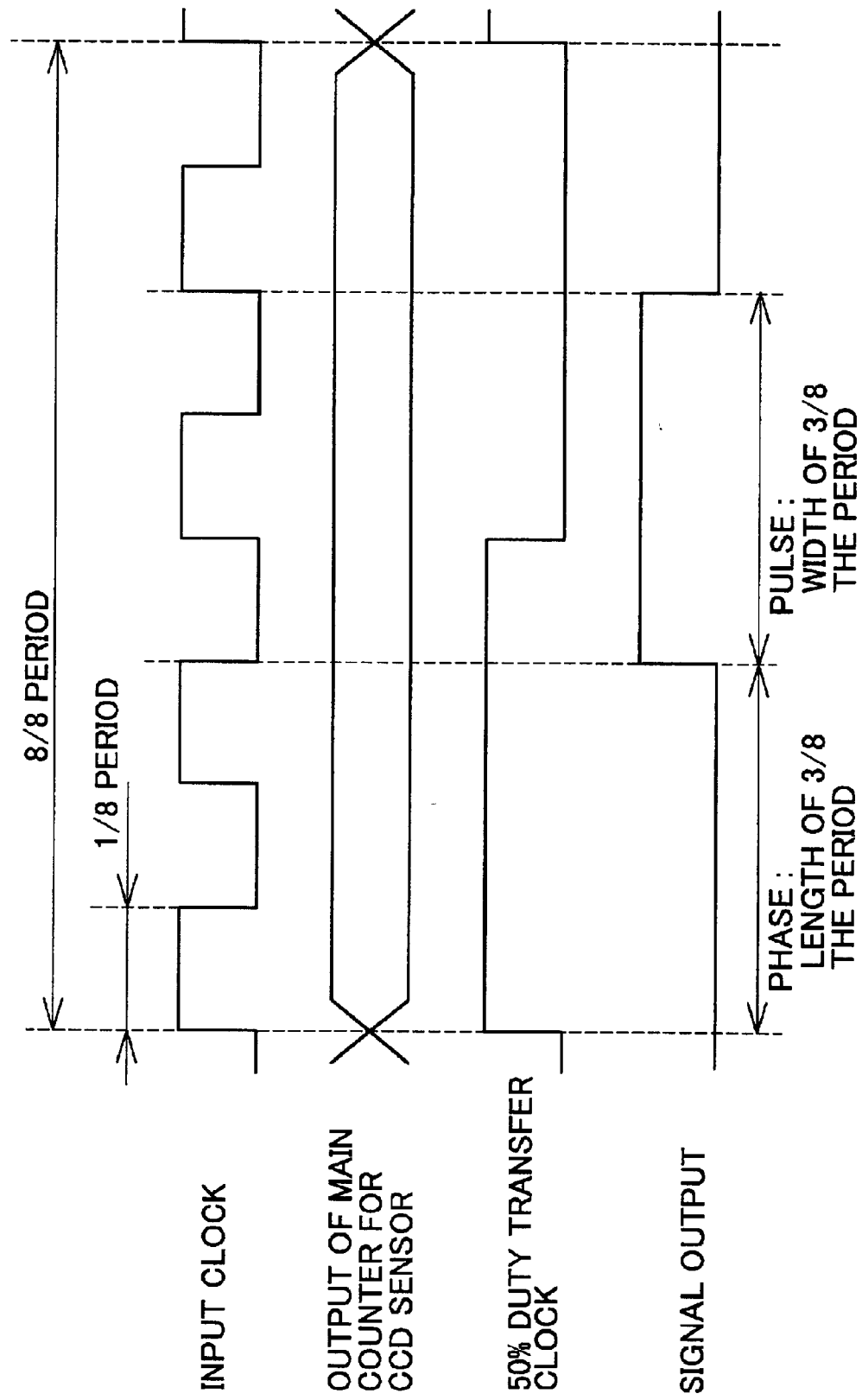
FIG. 19 is an explanatory diagram illustrating the phase length and the pulse width of signals generated in the signal generator circuits 112A and 112B shown in FIG. 17.

The signal generator circuit 12A is responsive to a multiplied clock signal TC from the PLL circuit 14 and the load signal NRD from the load signal generator circuit 15 for generating and releasing the signal which has a desired pulse width and a desired phase length. The signal generator circuit 12A comprises, as shown in FIG. 3, a counter circuit 21, a pulse generator circuit 22, a delay circuit 23A, a delay circuit 23B, an OR gate 24, a NOT gate 25, and a delay control circuit 26. In other words, the signal generator circuit 12A is equivalent to the signal generator circuit 112A (FIG. 18), described previously, plus the delay control circuit 26.

Figure 4:
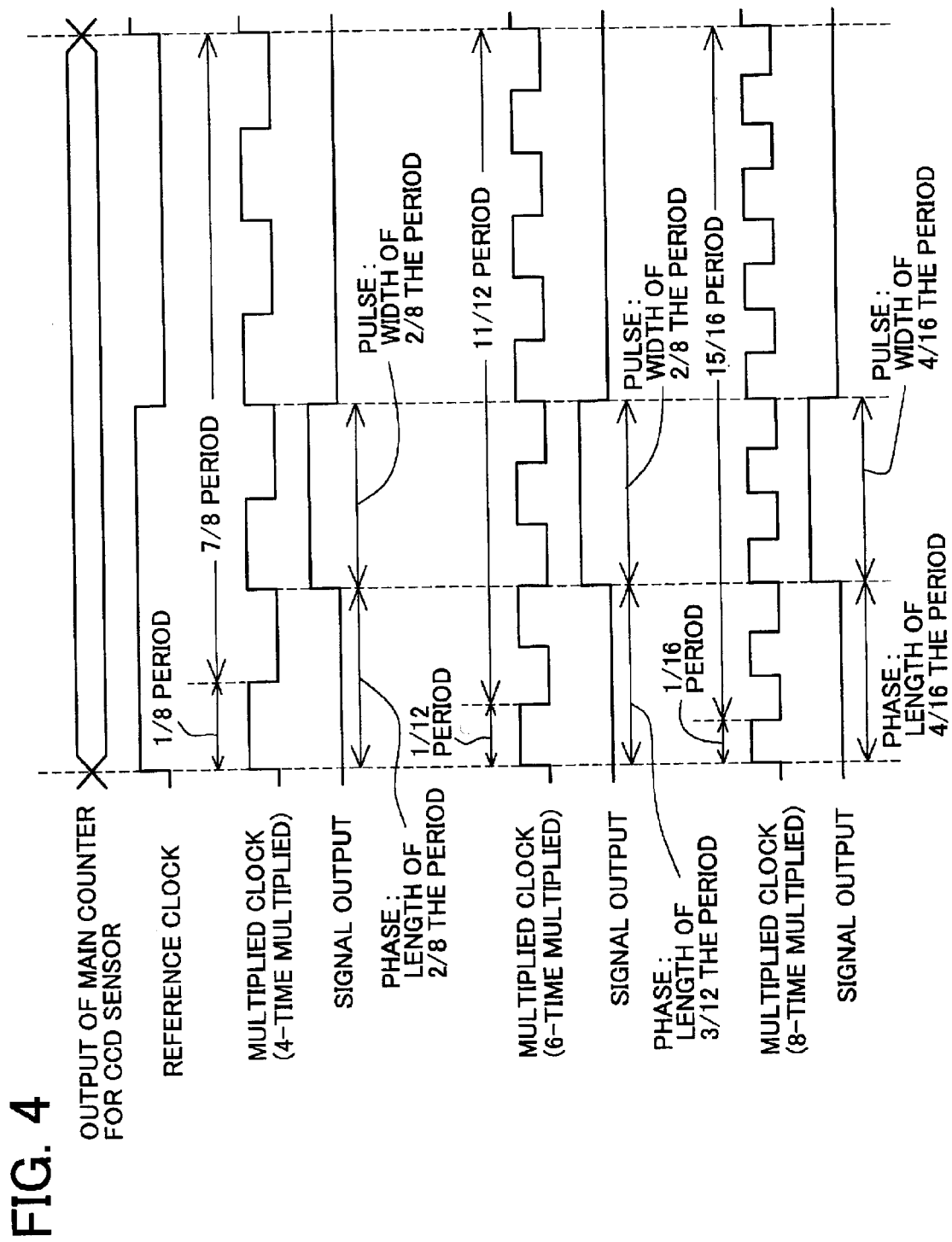
FIG. 4 is an explanatory diagram illustrating the phase length and the pulse width of signals generated in the signal generator circuits 12A and 12B shown in FIG. 2.

The pulse width and phase length of the signal generated in the signal generator circuit 12A are determined in small steps with the use of a multiplication rate of the multiplied clock signal TC as shown in FIG. 4. More specifically, when one period is determined for reading CCD pixels, the pulse width and phase length of generated signals may be selected from $2/8$ to $7/8$ the period and $9/8$ to $7/8$ the period respectively based on between the leading edge and the trailing edge of a pulse of the four-time multiplied clock signal TC, $2/12$ to $11/12$ the period and $9/12$ to $11/12$ the period respectively based on the six-time multiplied clock signal TC, and $2/16$ to $15/16$ the period and $9/16$ to $15/16$ the period respectively based on the eight-time multiplied clock signal TC. When the multiplication rate is increased, the pulse-width and phase length can be determined in smaller steps. This allows the pulse width and phase length of the control signals generated to be maintained in the controllable accuracy even if the driving frequency (of the input clock signal EN) in the CCD sensor 1 is lowered.

The output signal shown in FIG. 4 has a pulse width of $2/8$ the period and a phase length of $2/8$ the period at the multiplication by four, a pulse width of $3/12$ the period and a phase length of $3/12$ the period at the multiplication by six, a pulse width of $4/16$ the period and a phase length of $4/16$ the period at the multiplication by eight. Also, FIG. 4 schematically shows the pulse width and phase length of each multiplied clock signal. In fact, $1/8$ the period at the multiplication by four, $1/12$ the period at the multiplication by six, and $1/16$ the period at the multiplication by eight are identical in the duration of time.

Figure 5:
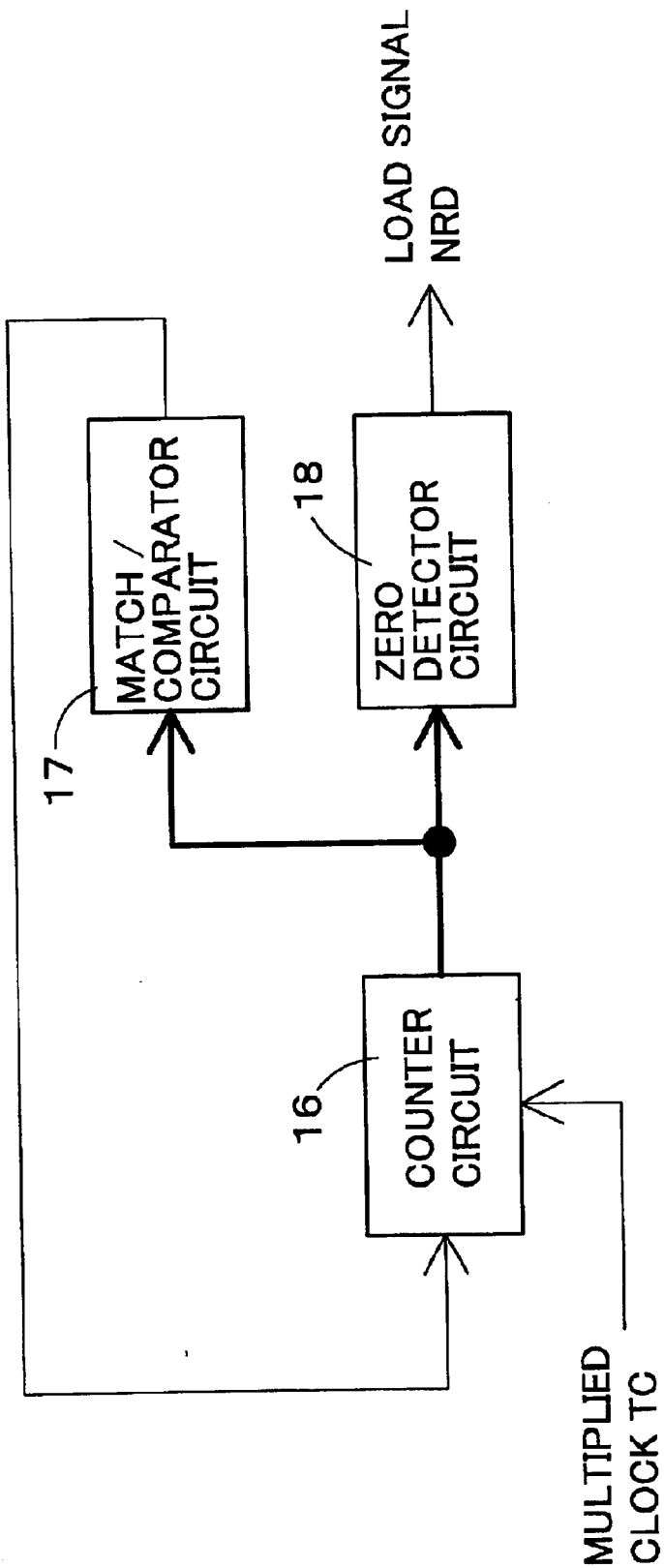
FIG. 5 is a block diagram of a schematic arrangement of the load signal generator circuit shown in FIG. 2.

The PLL circuit 14 generates a multiplied clock signal TC at a predetermined multiplication rate from the reference clock signal SC. The load signal generator circuit 15 generates the load signal NRD from the multiplied clock signal TC. The load signal generator circuit 15 comprises, as shown in FIG. 5, a counter circuit 16, a match/comparator circuit 17, and a zero detector circuit 18. The counter circuit 16 receives an output signal of the match/comparator circuit 17 and releases "0" as the count data. Otherwise, it continues counting up as timed with the multiplied clock signal TC until the succeeding signal is received. The match/comparator circuit 17 compares the count data with (multiplication rate−1). When the two are equal to each other, a signal is released. The zero detector circuit 18 releases the load signal NRD upon detecting that the count data of the counter circuit 16 is "0".

Referring back to FIG. 3, the counter circuit 21 is responsive to the load signal NRD from the load signal generator circuit 15 for delaying a load value determined from a table shown in FIG. 6 by one cycle of the multiplied clock signal TC. Otherwise, the counter circuit 21 continues counting up until the other load signal is received. The table of FIG. 6 illustrates 4, 6, and 8 of the multiplication rate.

The pulse generator circuit 22 compares between the output of the counter circuit 21 and its comparative valve listed in a table shown in FIG. 7. When the output of the counter circuit 21 is smaller than the comparative value, the output signal is released at "H" level. Otherwise, the output signal is released at "L" level. Meanwhile, the output signal is delayed by two cycles of the multiplied clock signal TC. The table of FIG. 7 illustrates 4, 6, and 8 of the multiplication rate.

Figure 8:
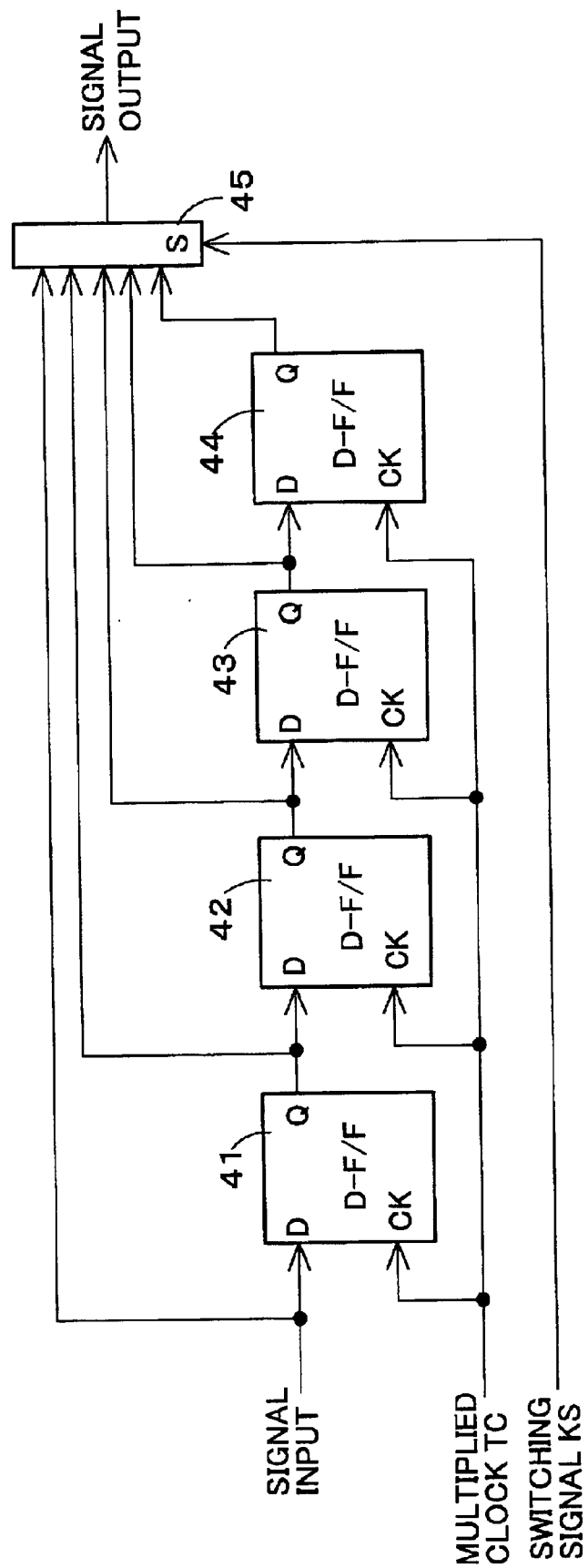
FIG. 8 is a block diagram of a schematic arrangement of the delay control circuit shown in FIG. 3.

The delay control circuit 26 delays and releases the input signal. The delay control circuit 26 comprises, as shown in FIG. 8, four delay type flip-flops 41 to 44 and a selector 45. The delay type flip-flops 41 to 44 are different in the pipeline delay number. Hence, the selector 45 receives their output signals having different pipeline delay numbers. The selector 45 selects and passes one of the input signals which has a desired pipeline delay number. The selecting action of the selector 45 is determined by a switching signal KS. More specifically, when the multiplication rate is 4 or higher, the delay control circuit 26 delays the input signal by (2× (multiplication rate−4)) cycles of the multiplied clock signal TC.

The delay circuit 23C delays the output of the delay control circuit 26 by three cycles of the multiplied clock signal TC so that the pipeline delay number of the signal generator circuit 12A with no delaying action of the delay control circuit 26 is equal to eight cycles of the multiplied clock signal TC.

The delay circuit 23A is synchronized with the leading edge of the multiplied clock signal TC and when n is an even number at the phase length of (n/(multiplication rate×2)) the period, delays its input signal by two cycles of the multiplied clock signal TC. When n is an odd number at the phase length of (n/(multiplication rate×2)) the period and m is an odd number at the pulse width of (m/(multiplication rate×2)) the period, the delay circuit 23A delays its input signal by three cycles of the multiplied clock signal TC. Otherwise, the output signal is released at "L" level.

The delay circuit 23B is synchronized with the trailing edge of the multiplied clock signal TC and when n is an odd number at the phase length of (n/(multiplication rate×2)) the period, delays its input signal by 2.5 cycles of the multiplied clock signal TC. Otherwise, the output signal is released at "L" level.

Figure 9:
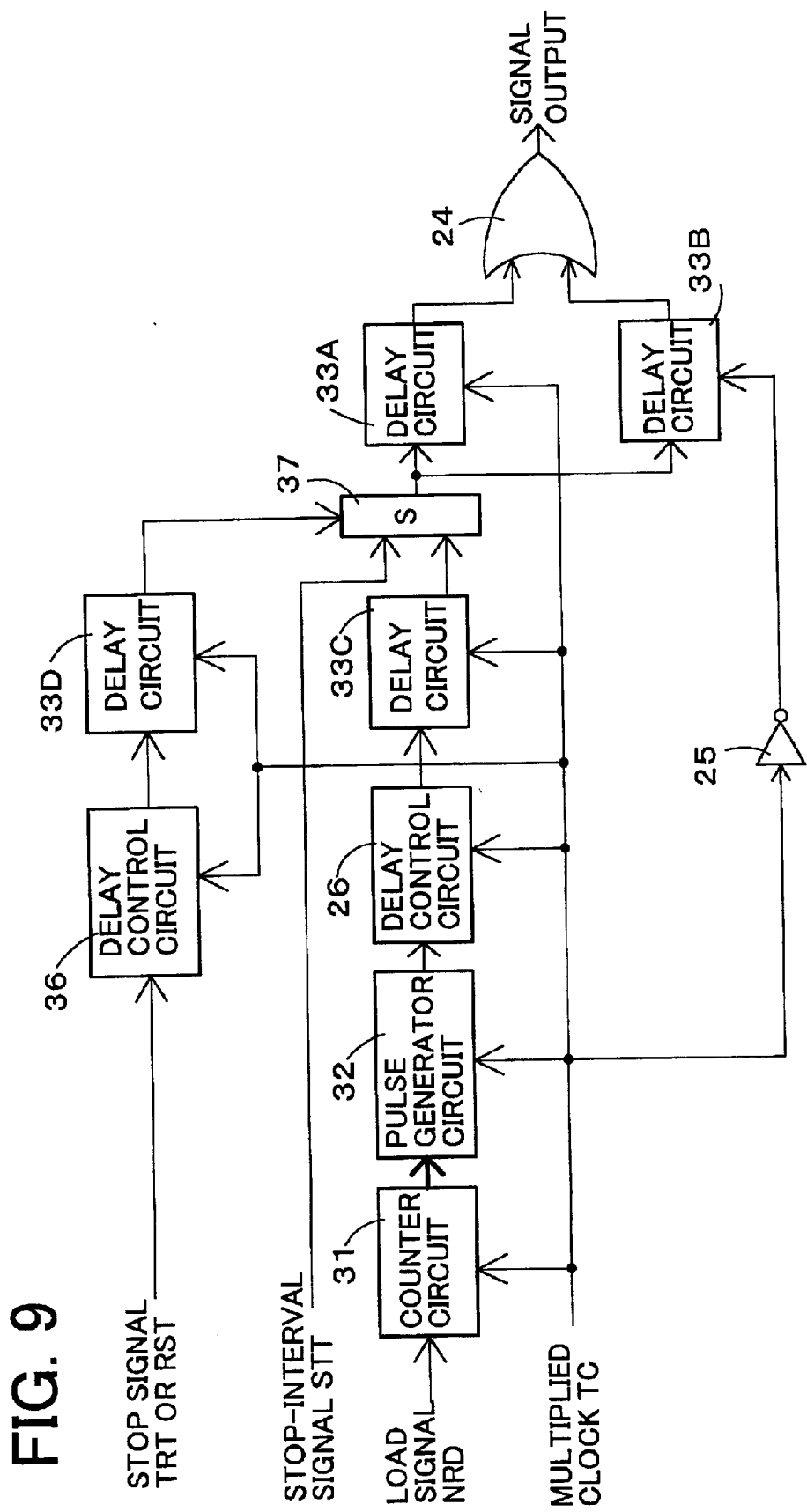
FIG. 9 is a block diagram of a schematic arrangement of the signal generator circuit 12B shown in FIG. 2.
Figure 22:
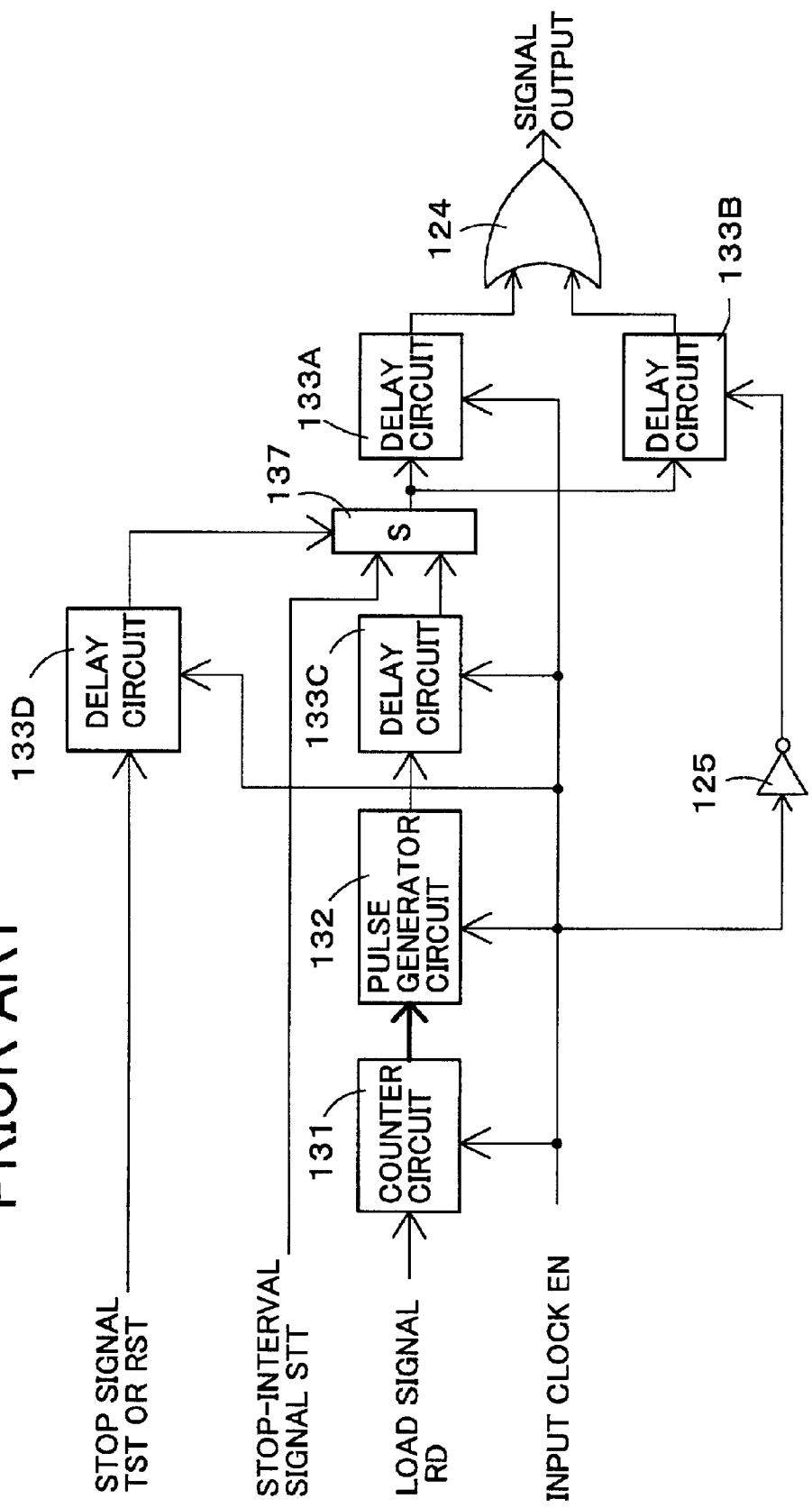
FIG. 22 is a block diagram of a schematic arrangement of the signal generator circuit 112B shown in FIG. 17.
Figure 23:
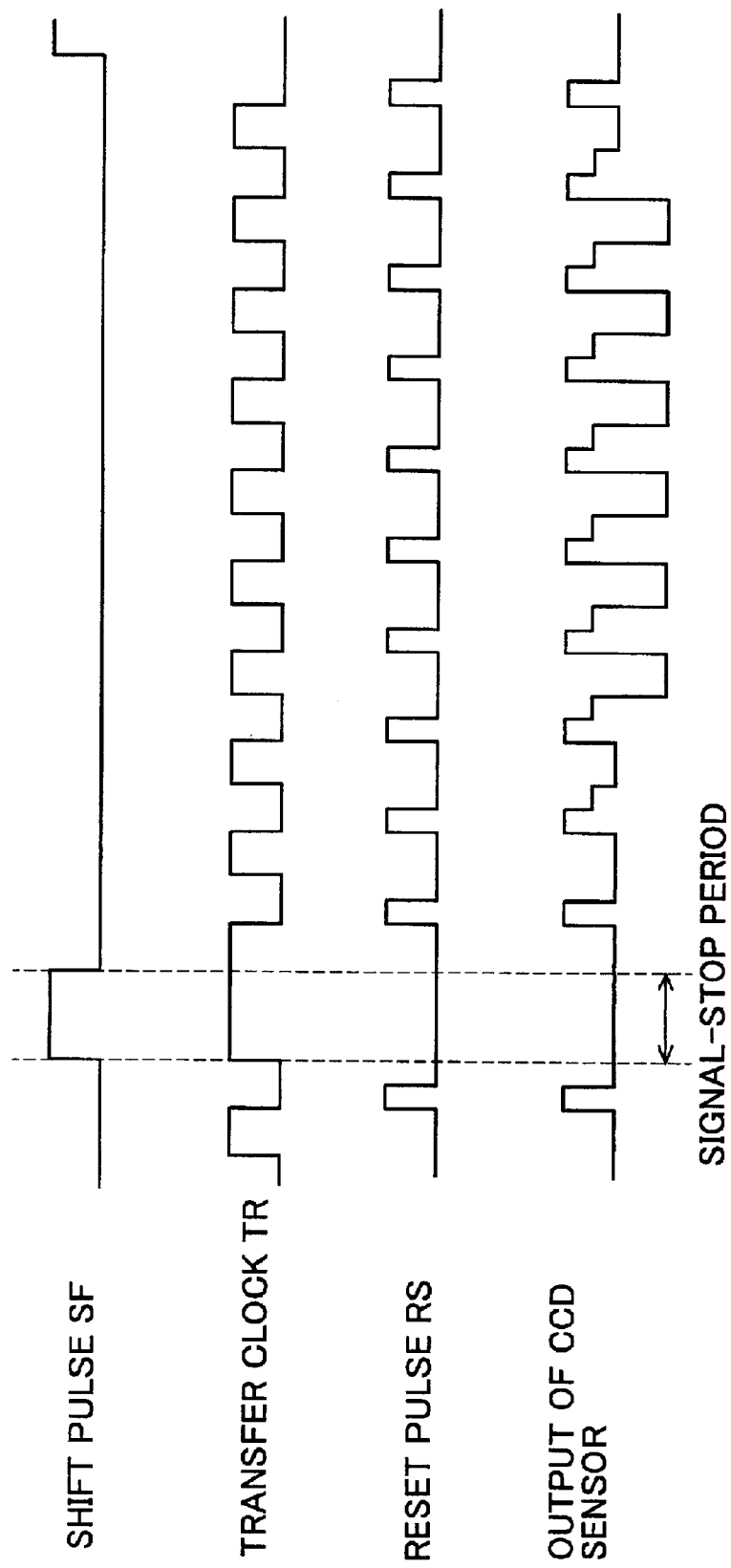
FIG. 23 is a timing chart illustrating the waveform (of one line) of signals for driving a CCD sensor.
Figure 24:
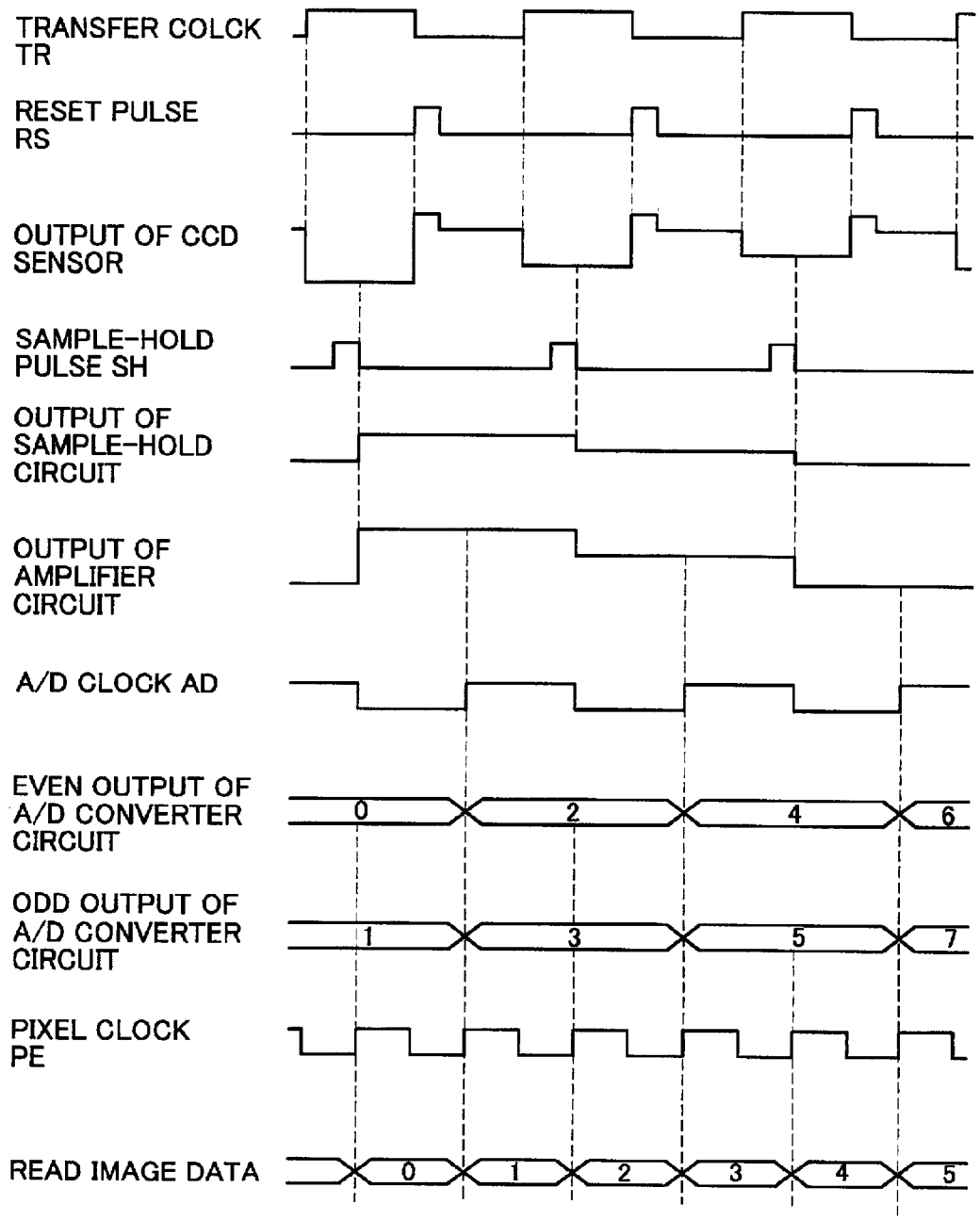
FIG. 24 is a timing chart illustrating the waveform of signals in the conventional image reading apparatus.
Figure 25:
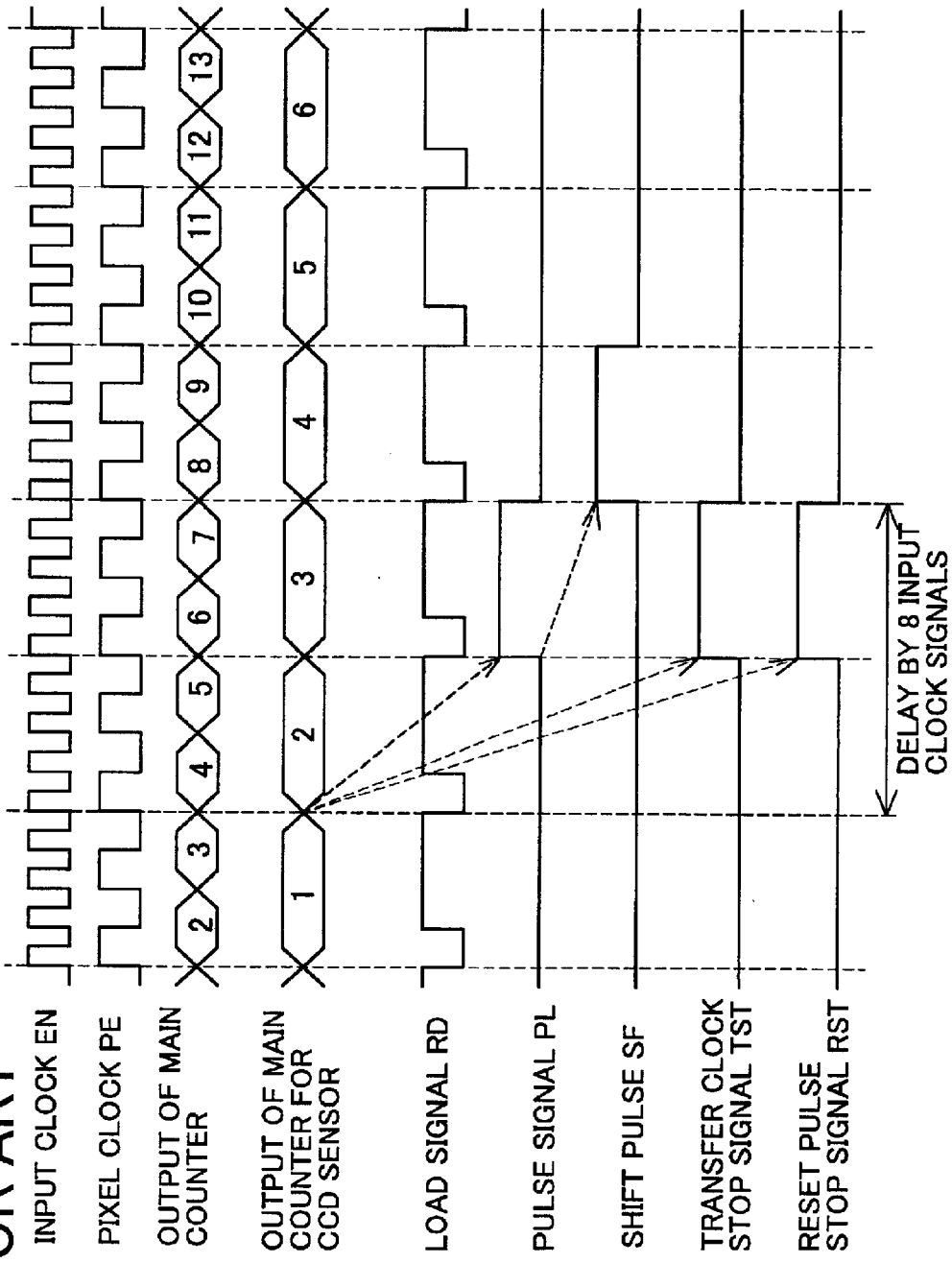
FIG. 25 is a timing chart of the main counter circuit shown in FIG. 17.

FIG. 9 is a block diagram of the signal generator circuit 12B. The signal generator circuit 12B comprises a counter circuit 31, a pulse generator circuit 32, a delay circuit 33A, a delay circuit 33B, a delay circuit 33C, an OR gate 24, a NOT gate 25, a delay circuit 33D, a selector 37, and two delay control circuits 26 and 36. In other words, the signal generator circuit 12B is equivalent to the conventional signal generator circuit 112B (FIG. 22) plus the two delay control circuits 26 and 36.

The signal generator circuit 12B has desired pulse width and phase length responsive to the multiplied clock signal TC, the load signal NRD, and the stop signal TST or RST and outputs a signal that has been negated during a predetermined stop period.

The delay control circuit 36 is identical in the structure to the delay control circuit 26 (FIG. 8) for delaying the input signal. More particularly, the delay control circuit 36 delays the input signal by (multiplication rate−4) cycles of the multiplied clock signal TC when the multiplication rate is 4 or higher.

The delay circuit 33D outputs the stop signal TST or RST delaying by two cycles of the multiplied clock signal TC so that the pipeline delay number before the signal is negated at the outside should be equal to eight cycles of the multiplied clock signal TC with reference to counts by the main counter for the CCD sensor.

The selector 37 selects and passes the stop-interval signal STT when the output of the delay circuit 33D is at "H" level. When the output of the delay circuit 33D is at "L" level, the selector 37 selects and passes the output signal of the delay circuit 33C. The stop-interval signal STT is provided for determining whether the stop signal is enabled at "H" or "L" level and may be set to either "H" or "L" level. In this embodiment, the stop-interval signal STT is set to "L" level.

The counter circuit 31, the pulse generator circuit 32, and the delay circuits 33A to 33C are identical in the arrangement to the counter circuit 21, the pulse generator circuit 22, and the delay circuits 23A o 23C in the signal generator circuit 12A and will be explained in no more detail.

The action of the image reading apparatus of the embodiment having the foregoing arrangement will now be explained. The CCD sensor 1 is driven by the pulse signal PL, the transfer clock signal NTR, and the reset pulse signal NRS. Its action is equal to that of the conventional image reading apparatus described previously and will be explained in no more detail.

Figure 10:
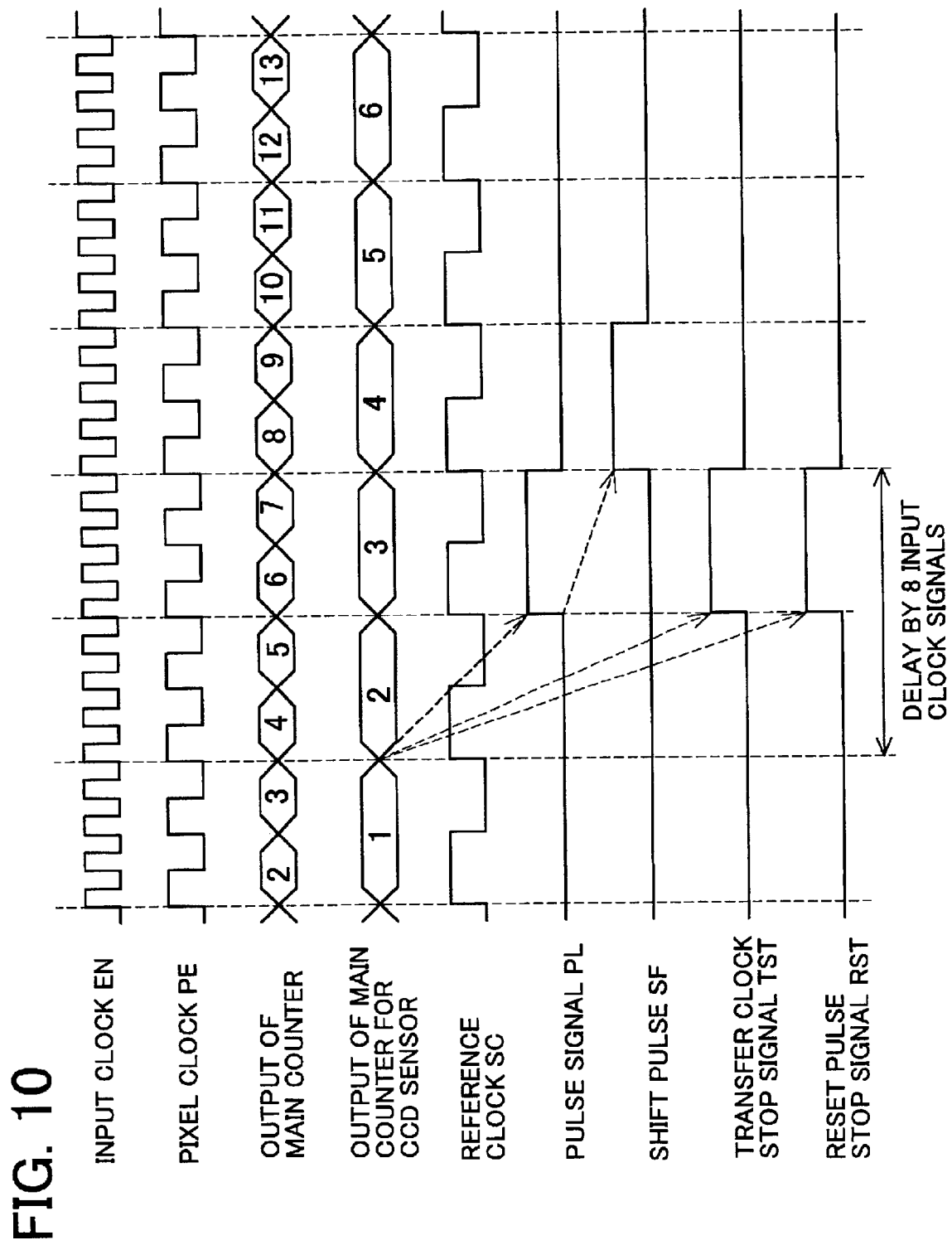
FIG. 10 is a timing chart of the main counter circuit shown in FIG. 2.

The actions of the main counter circuit 11, the signal generator circuit 12A, and the signal generator circuit 12B for generating the various signals are then explained. The action of the main counter circuit 11 is first explained referring to FIG. 10. The main counter circuit 11 receives the input clock signal EN. The input clock signal EN is frequency divided to form the pixel clock signal PE. The pixel clock signal PE is frequency divided to form the PLL reference clock signal SC. Also, the pulse signal PL, the transfer clock stop signal TST, and the reset pulse stop signal RST are generated on the pixel-by-pixel basis from the CCD sensor 1. The output signal of the main counter indicates the position of pixels in the image data at the timing of the pixel clock signal PE. The output signal of the main counter for the CCD sensor is equivalent to the output of the main counter from which the least significant bit is omitted.

The pulse signal PL, the transfer clock stop signal TST, and the reset pulse stop signal RST are then delayed by one CCD pixel (four cycles of the input clock signal EN) from the predetermined position (at 2 shown in FIG. 10) on the main counter for the CCD sensor. The pulse signal PL is further delayed by one CCD pixel in the delay circuit 13 and released as the shift pulse signal SF. The delay by one CCD pixel is necessary for synchronization with the other signals at the same pipeline delay number.

The pipeline delay number before the output signal is released out from the main counter circuit 11 is held to two CCD pixels (four cycles of the pixel clock signal=eight cycles of the input clock signal) for each signal by the action of the two signal generator circuits 12A and 12B. This ensures the synchronization between the output signal of the CCD sensor 1 and the read image data.

The actions of the signal generator circuits 12A and 12B are now explained. It is assumed in this embodiment that the read image data is not processed at 40 MHz but the driving frequency is lowered. More particularly, the image reading apparatus of the embodiment is applied to a low-speed system where the read image data is processed at the driving frequency of 26.67 MHz. Also, the multiplication rate of the PLL circuit 14 is set to 6. Accordingly the action of the signal generator circuit 12A is classified into four modes depending on the even and odd of m and n at the pulse width of m/12 the period and the phase length of n/12 the period.

Figure 11:
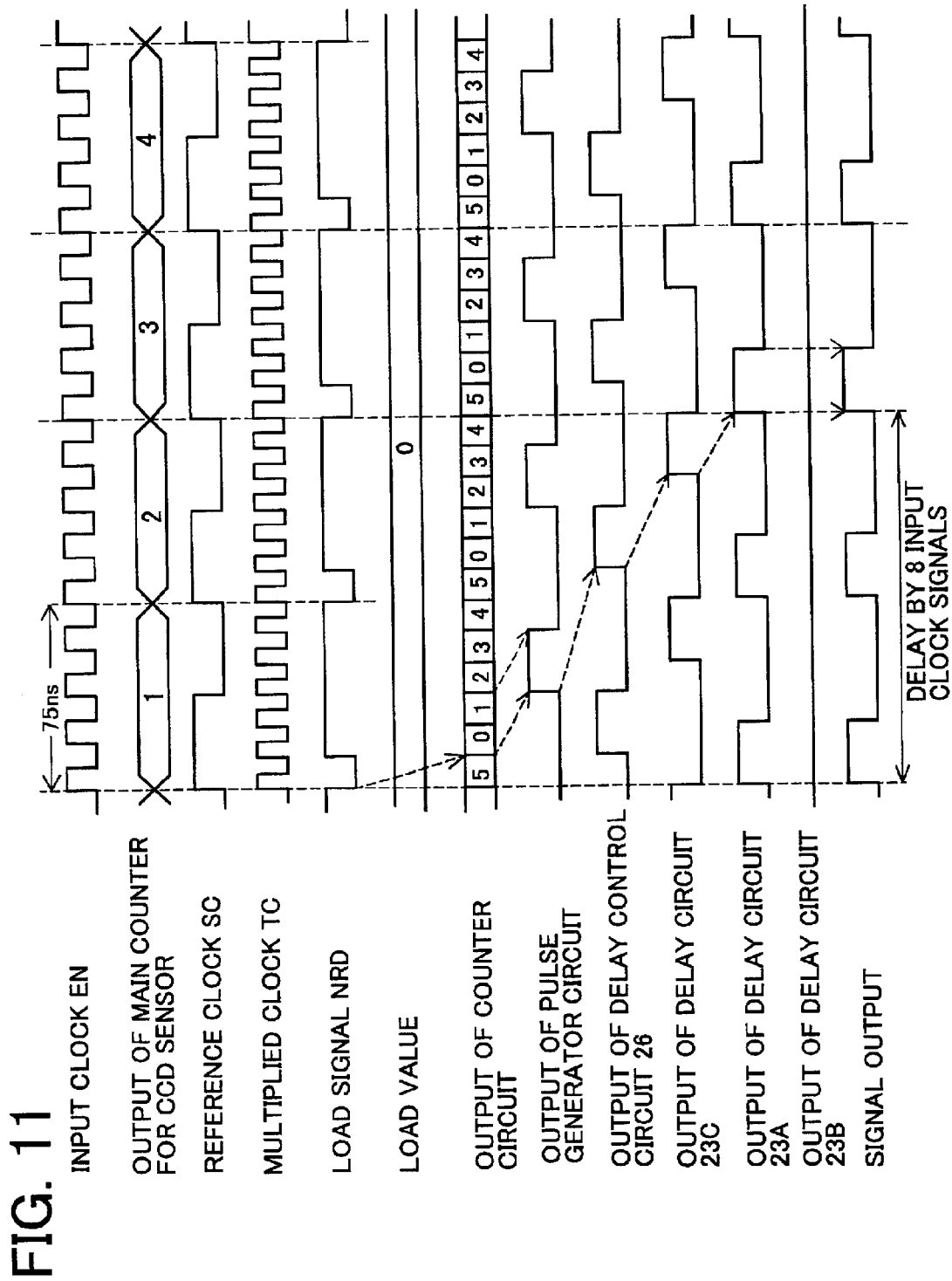
FIG. 11 is a timing chart of the signal generator circuit 12A shown in FIG. 3.
Figure 12:
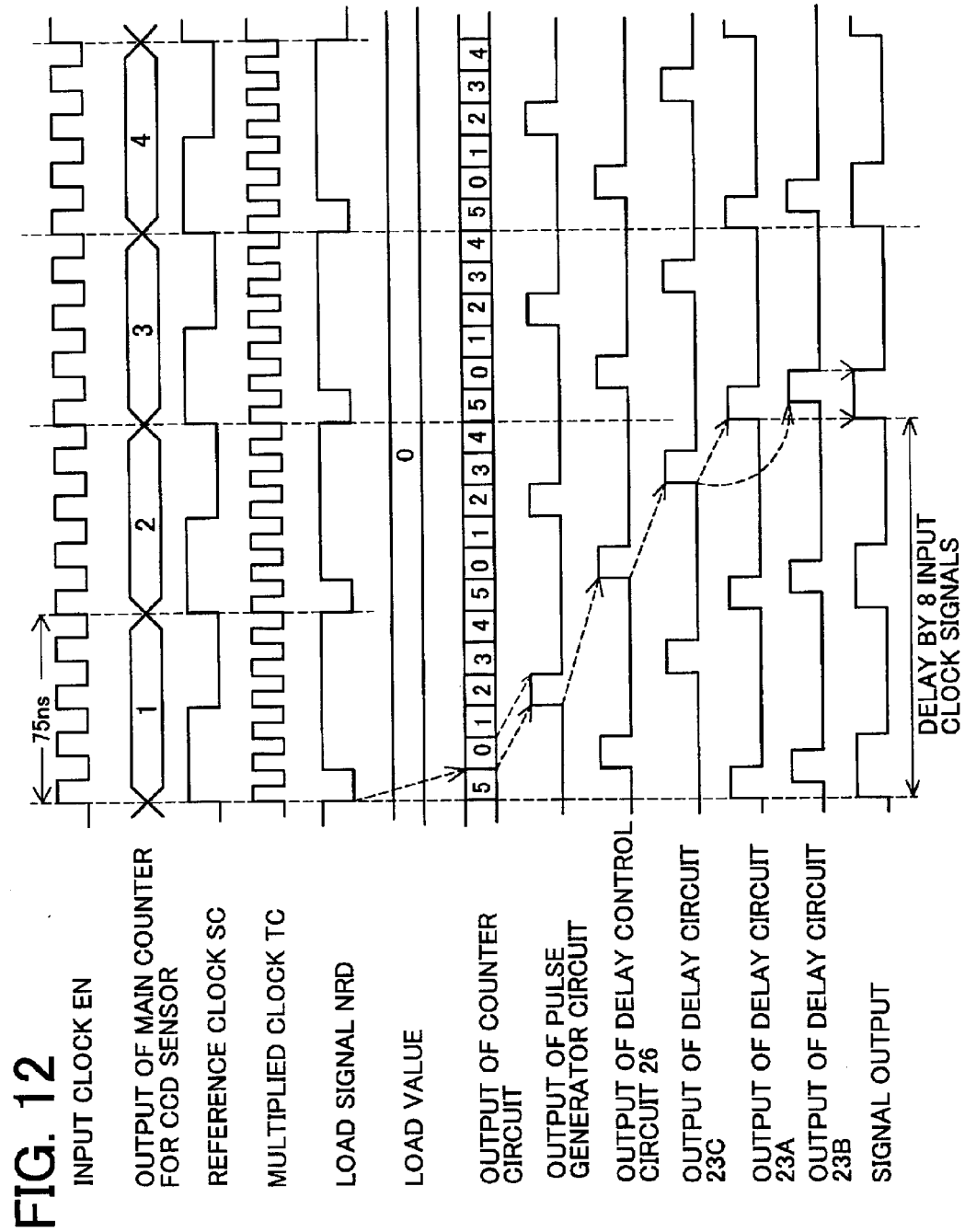
FIG. 12 is a timing chart of the signal generator circuit 12A shown in FIG. 3.
Figure 13:
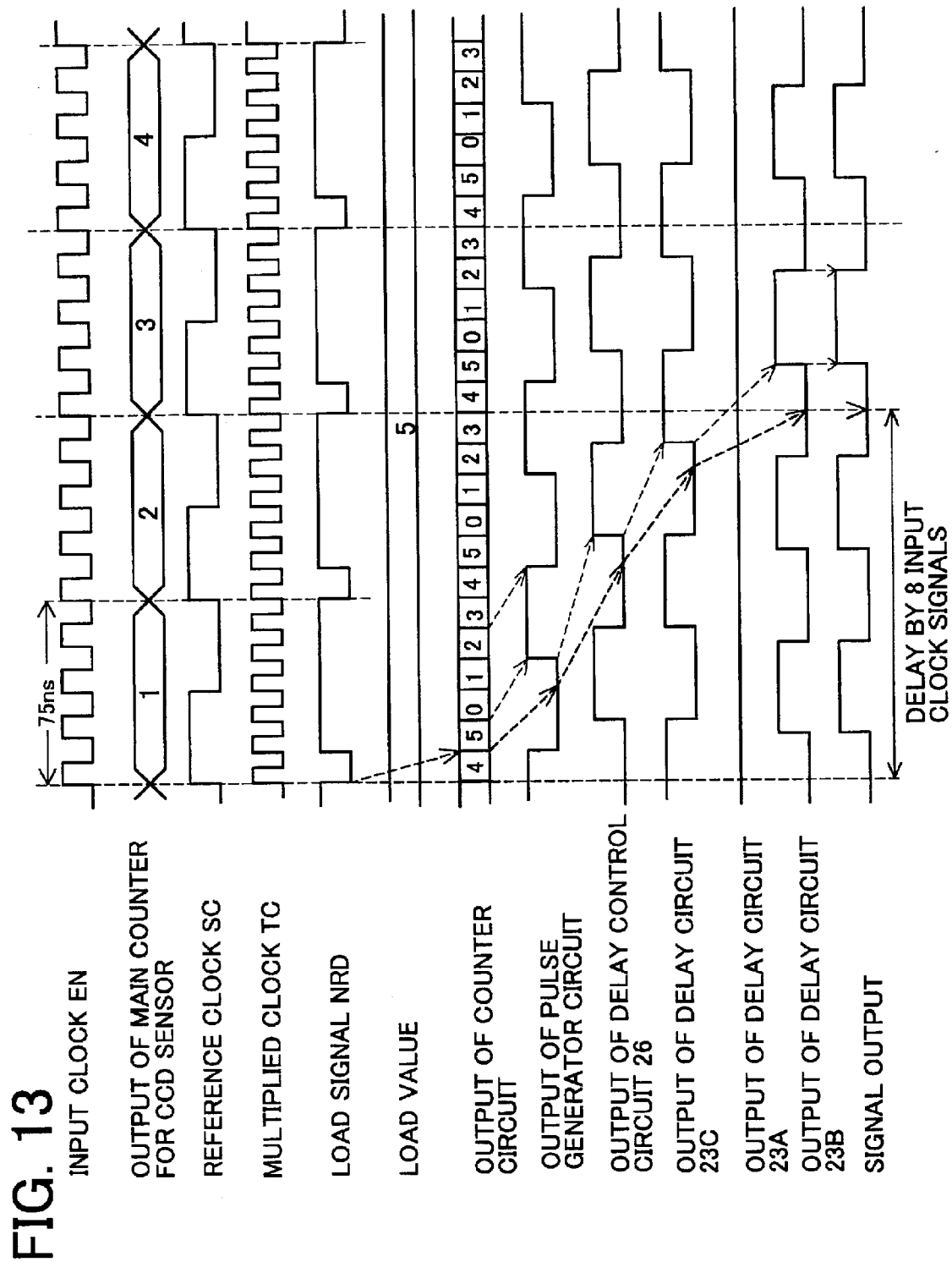
FIG. 13 is a timing chart of the signal generator circuit 12A shown in FIG. 3.
Figure 14:
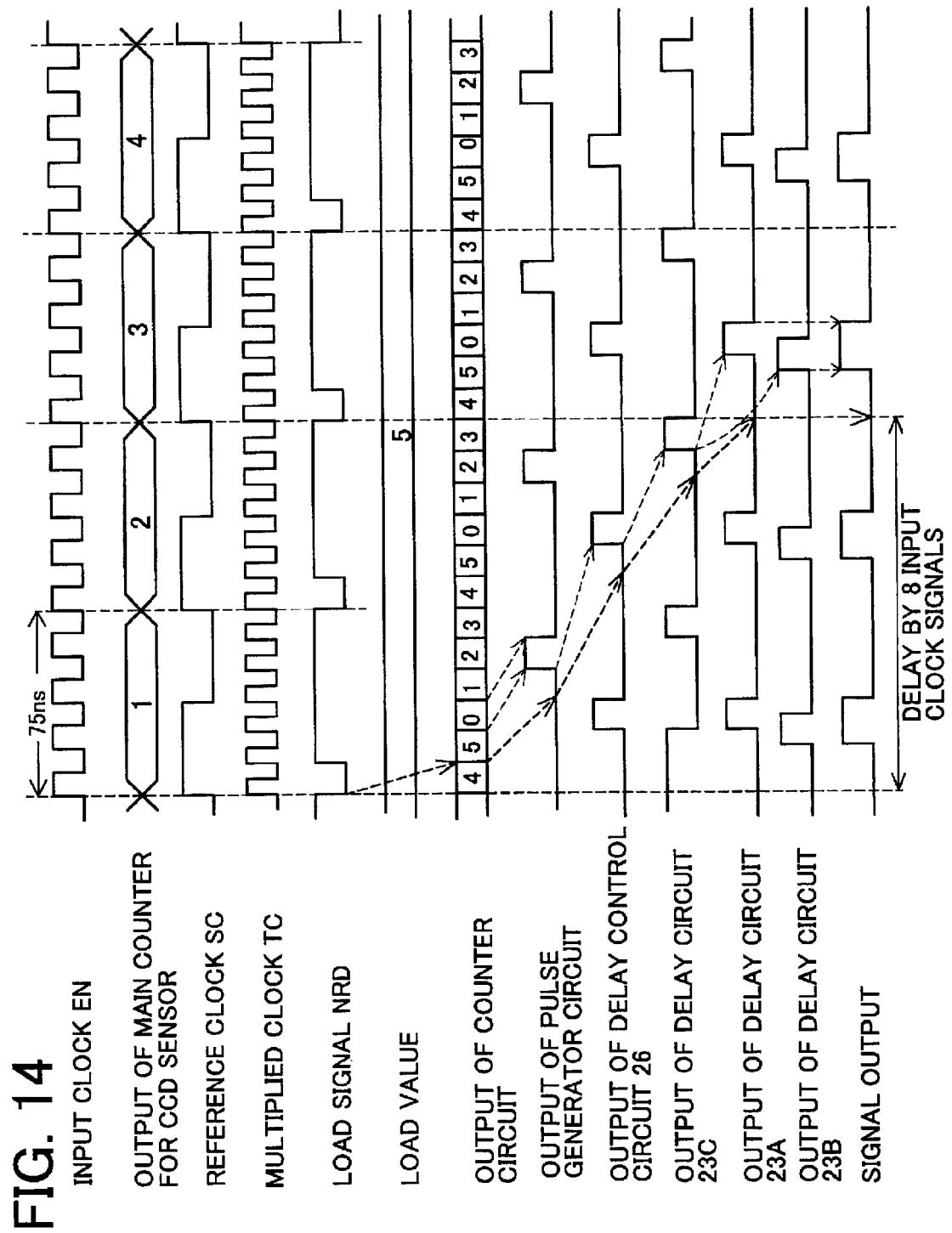
FIG. 14 is a timing chart of the signal generator circuit 12A shown in FIG. 3.

FIGS. 11 to 14 illustrate timing charts of the four modes of the action of the signal generator circuit 12A. FIG. 11 is the timing chart of the signal generator circuit 12A where the pulse width is 4/12 the period (m being an even number) and the phase length is zero the period (n being an even number). FIG. 12 is the timing chart of the signal generator circuit 12A where the pulse width is 3/12 the period (m being an odd number) and the phase length is zero the period (n being an even number). FIG. 13 is the timing chart of the signal generator circuit 12A where the pulse width is 6/12 the period (m being an even number) and the phase length is 3/12 the period (n being an odd number). FIG. 14 is the timing chart of the signal generator circuit 12A where the pulse width is 3/12 the period (m being an odd number) and the phase length is 3/12 the period (n being an odd number).

Figure 26:
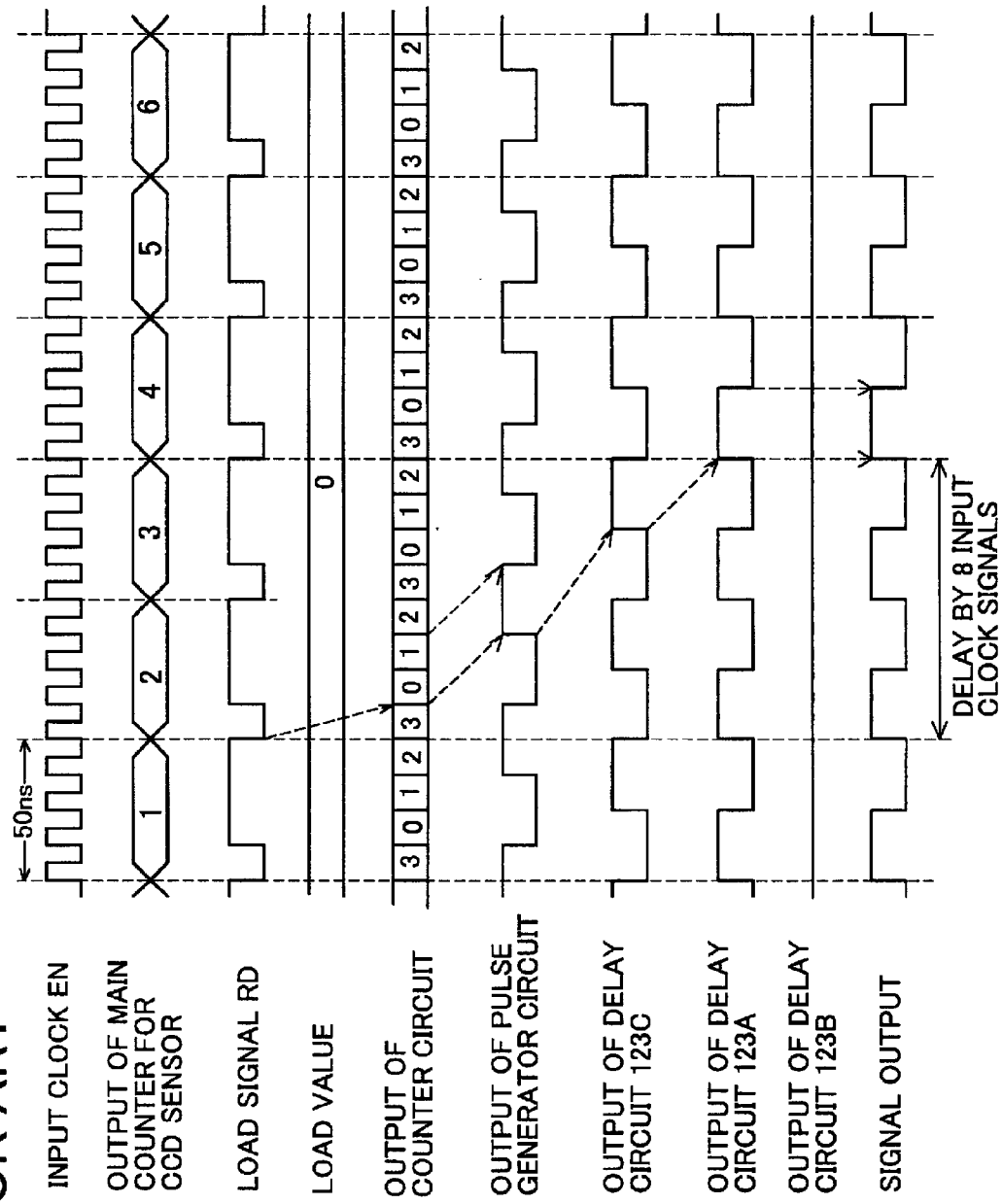
FIG. 26 is a timing chart of the signal generator circuit 112A shown in FIG. 18.

The action of the signal generator circuit 12A where the pulse width is 4/12 the period and the phase length is zero the period will be explained as shown in FIG. 11. This corresponds to the pulse width of 4/8 the period and the phase length of zero the period at the driving frequency of 40 MHz (FIG. 26). As in the table of FIG. 6, when the phase length is zero the period, the load value is "0". The output signal of the counter circuit 21 is thus equivalent to the count data "0" delayed by one cycle of the multiplied clock signal TC. As shown in the table of FIG. 7, when the pulse width is $4/12$ the period, the comparative value is "2". Accordingly, the pulse generator circuit 22 releases the signal which is at "H" level when the output of the counter circuit 21 is smaller (namely 0 or 1) than the comparative value "2" and has been delayed by two cycles of the multiplied clock signal TC.

The output signal of the pulse generator circuit 22 is delayed again by (2×(6−4)=4) cycles in the delay control circuit 26. The output signal of the delay control circuit 26 is further delayed by three cycles of the multiplied clock signal TC in the delay circuit 23C. The output signal of the delay circuit 23C is further delayed by two cycles of the multiplied clock signal TC in the delay circuit 23A. Meanwhile, as the phase length is zero the period, the output signal of the delay circuit 23B remains at "L" level. The OR gate 24 finally determines the state of the output signal of the signal generator circuit 12A from the two output signals of the delay circuits 23A and 23B. The output signal of the signal generator circuit 12A has a pulse width of $4/12$ the period and a phase length of zero the period. Those are substantially equivalent to a pulse width of $1/8$ the period and a phase length of zero the period at the driving frequency of 40 MHz (FIG. 26) in the actual time base. This stands because the $1/12$ the period of the six-time multiplied clock signal TC is actually equal to $1/8$ the period of the input clock signal EN. Accordingly, even when the driving frequency is lowered (from 40 MHz to 26.67 MHz), the pulse width and phase length of the signals generated in the signal generator circuit 12A can be maintained in the controllable accuracy.

The output signal of the signal generator circuit 12A has been delayed by two CCD pixels (eight cycles of the input clock signal EN). Accordingly, the output signal of the signal generator circuit 12A can constantly be synchronized with the shift pulse signal SF which is generated from the input clock signal EN and delayed by two CCD pixels (eight cycles of the input clock signal).

Figure 27:
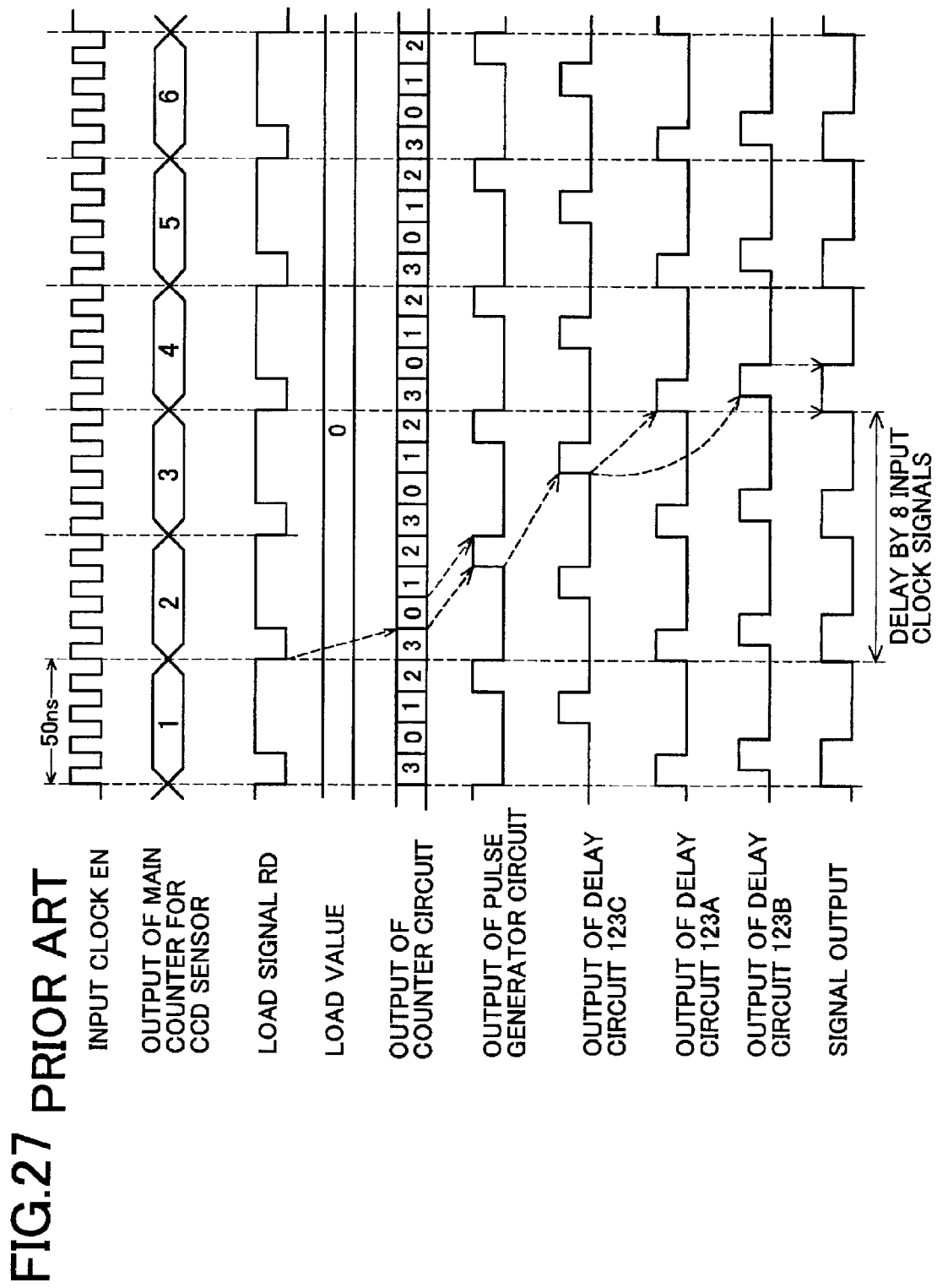
FIG. 27 is a timing chart of the signal generator circuit 112A shown in FIG. 18.

The action of the signal generator circuit 12A where the pulse width is $3/12$ the period and the phase length is zero the period will be explained as shown in FIG. 12. This corresponds to the pulse width of $3/8$ the period and the phase length of zero the period at the driving frequency of 40 MHz (FIG. 27). As in the table of FIG. 6, when the phase length is zero the period, the load value is "0". The output signal of the counter circuit 21 is thus equivalent to the count data "0" delayed by one cycle of the multiplied clock signal TC. As shown in the table of FIG. 7, when the pulse width is $3/12$ the period, the comparative value is "1". Accordingly, the pulse generator circuit 22 releases the signal which is at "H" level when the output of the counter circuit 21 is smaller (namely 0) than the comparative value "1" and has been delayed by two cycles of the multiplied clock signal TC.

The output signal of the pulse generator circuit 22 is delayed again by (2×(6−4)=4) cycles in the delay control circuit 26. The output signal of the delay control circuit 26 is further delayed by three cycles of the multiplied clock signal TC in the delay circuit 23C. The output signal of the delay circuit 23C is further delayed by two cycles of the multiplied clock signal TC in the delay circuit 23A. Meanwhile, as the phase length is zero the period, the output signal of the delay circuit 23B remains at "L" level. The OR gate 24 finally determines the state of the output signal of the signal generator circuit 12A from the two output signals of the delay circuits 23A and 23B. The output signal of the signal generator circuit 12A has a pulse width of $3/12$ the period and a phase length of zero the period. Those are substantially equivalent to a pulse width of $3/8$ the period and a phase length of zero the period at the driving frequency of 40 MHz (FIG. 27) in the actual time base. This stands because the $1/12$ the period of the six-time multiplied clock signal TC is actually equal to $1/8$ the period of the input clock signal EN. Accordingly, even when the driving frequency is lowered (from 40 MHz to 26.67 MHz), the pulse width and phase length of the signals generated in the signal generator circuit 12A can be maintained in the controllable accuracy.

The output signal of the signal generator circuit 12A has been delayed by two CCD pixels (eight cycles of the input clock signal EN). Accordingly, the output signal of the signal generator circuit 12A can constantly be synchronized with the shift pulse signal SF which is generated from the input clock signal EN and delayed by two CCD pixels (eight cycles of the input clock signal).

Figure 28:
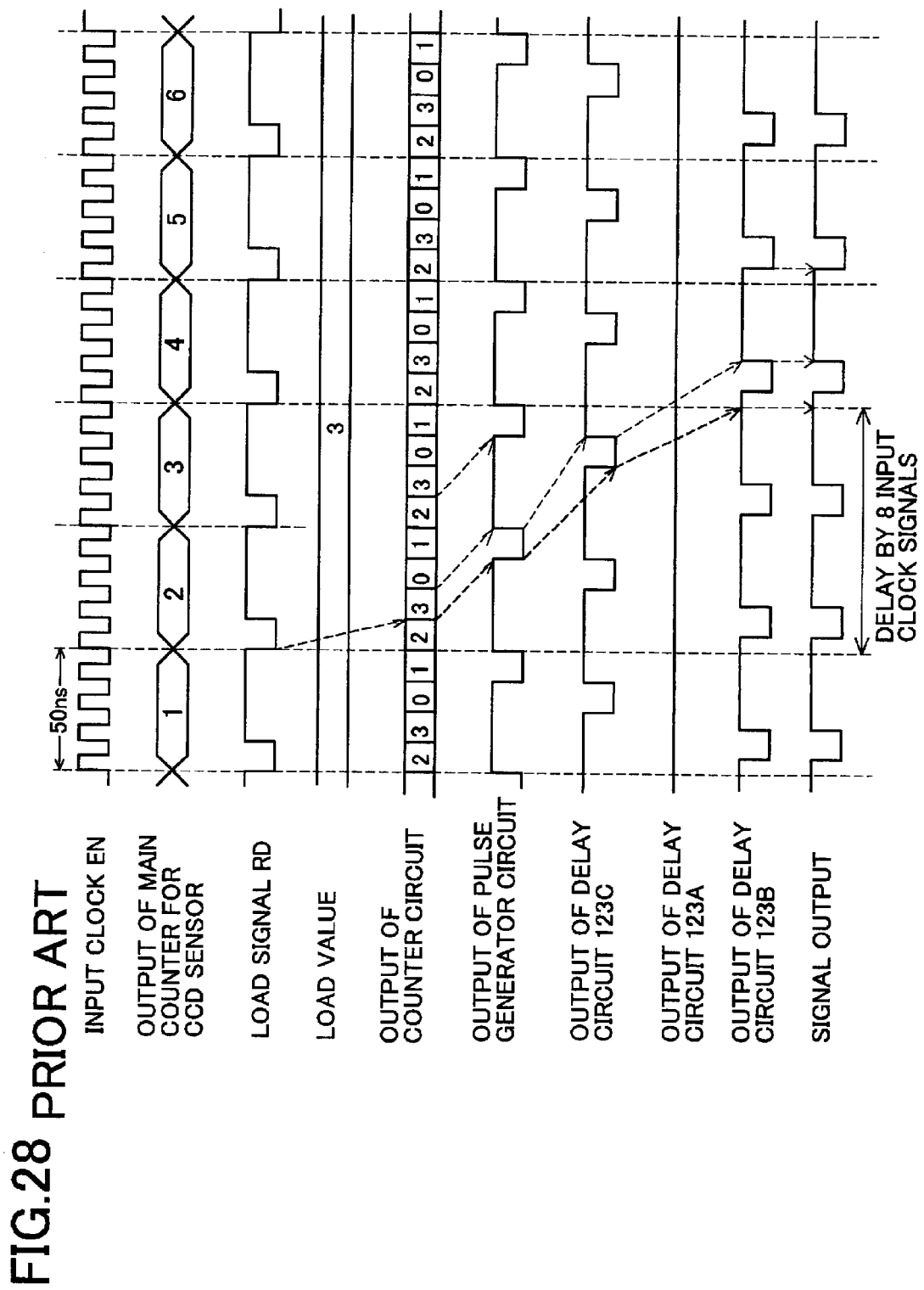
FIG. 28 is a timing chart of the signal generator circuit 112A shown in FIG. 18.

The action of the signal generator circuit 12A where the pulse width is $6/12$ the period and the phase length is $3/12$ the period will be explained as shown in FIG. 13. This corresponds to the pulse width of $6/8$ the period and the phase length of $3/8$ the period at the driving frequency of 40 MHz (FIG. 28). As in the table of FIG. 6, when the phase length is $3/8$ the period, the load value is "5". The output signal of the counter circuit 21 is thus equivalent to the count data "5" delayed by one cycle of the multiplied clock signal TC. As shown in the table of FIG. 7, when the pulse width is $6/12$ the period, the comparative value is "3". Accordingly, the pulse generator circuit 22 releases the signal which is at "H" level when the output of the counter circuit 21 is smaller (namely 0, 1, or 2) than the comparative value "3" and has been delayed by two cycles of the multiplied clock signal TC.

The output signal of the pulse generator circuit 22 is delayed again by (2×(6−4)=4) cycles in the delay control circuit 26. The output signal of the delay control circuit 26 is further delayed by three cycles of the multiplied clock signal TC in the delay circuit 23C. The output signal of the delay circuit 23C is transferred to both the delay circuits 23A and 23B. As the pulse length is $6/12$ the period at the phase length of $3/12$ the period, the output signal of the delay circuit 23A remains at "L" level. Also, the output signal of the delay circuit 23C is delayed by 2.5 cycles of the multiplied clock signal TC. The OR gate 24 finally determines the state of the output signal of the signal generator circuit 12A from the two output signals of the delay circuits 23A and 23B. The output signal of the signal generator circuit 12A has a pulse width of $6/12$ the period and a phase length of $3/12$ the period. Those are substantially equivalent to a pulse width of $6/8$ the period and a phase length of $3/8$ the period at the driving frequency of 40 MHz (FIG. 28) in the actual time base. This stands because the $1/12$ the period of the six-time multiplied clock signal TC is actually equal to $1/8$ the period of the input clock signal EN. Accordingly, even when the driving frequency is lowered (from 40 MHz to 26.67 MHz), the pulse width and phase length of the signals generated in the signal generator circuit 12A can be maintained in the controllable accuracy.

The output signal of the signal generator circuit 12A has been delayed by two CCD pixels (eight cycles of the input clock signal EN). Accordingly, the output signal of the signal generator circuit 12A can constantly be synchronized with the shift pulse signal SF which is generated from the input clock signal EN and delayed by two CCD pixels (eight cycles of the input clock signal).

Figure 29:
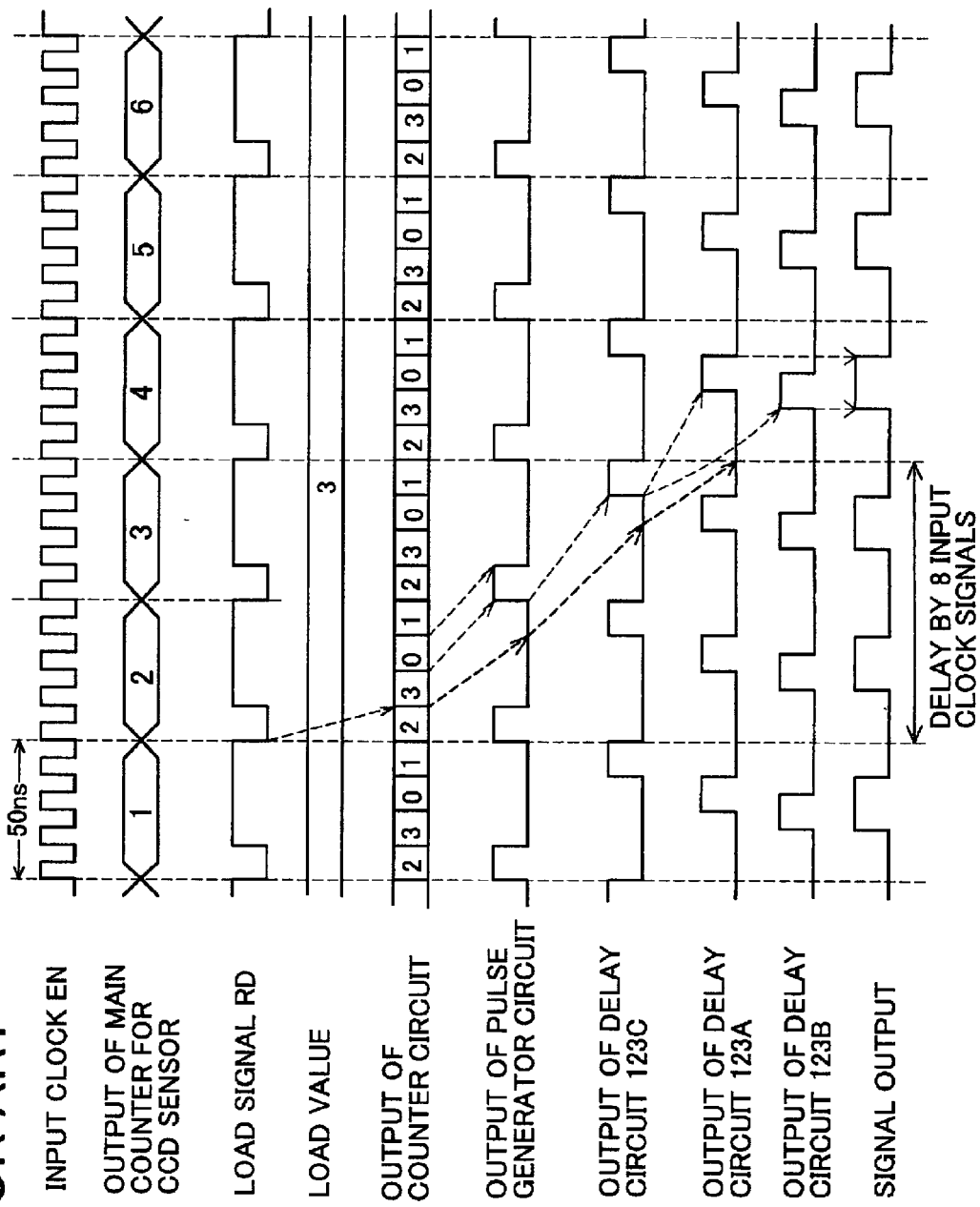
FIG. 29 is a timing chart of the signal generator circuit 112A shown in FIG. 18.

Finally, the action of the same where the pulse width is $3/12$ the period and the phase length is $3/12$ the period will be explained as shown in FIG. 14. This corresponds to the pulse width of ⅜ the period and the phase length of ⅜ the period at the driving frequency of 40 MHz (FIG. 29). As in the table of FIG. 6, when the phase length is 3/12 the period, the load value is "5". The output signal of the counter circuit 21 is thus equivalent to the count data "5" delayed by one cycle of the multiplied clock signal TC. As shown in the table of FIG. 7, when the pulse width is 3/12 the period, the comparative value is "1". Accordingly, the pulse generator circuit 22 releases the signal which is at "H" level when the output of the counter circuit 21 is smaller (namely 0) than the comparative value "1" and has been delayed by two cycles of the multiplied clock signal TC.

The output signal of the pulse generator circuit 22 is delayed again by (2×(6−4)=4) cycles in the delay control circuit 26. The output signal of the delay control circuit 26 is further delayed by three cycles of the multiplied clock signal TC in the delay circuit 23C. The output signal of the delay circuit 23C is transferred to both the delay circuits 23A and 23B.

As the pulse length is 6/12 the period at the phase length of 3/12 the period, the output signal of the delay circuit 23A is delayed by three cycles of the multiplied clock signal TC. Also, the output signal of the delay circuit 23C is delayed by 2.5 cycles of the multiplied clock signal TC. The OR gate 24 finally determines the state of the output signal of the signal generator circuit 12A from the two output signals of the delay circuits 23A and 23B. The output signal of the signal generator circuit 12A has a pulse width of 3/12 the period and a phase length of 3/12 the period. Those are substantially equivalent to a pulse width of ⅜ the period and a phase length of ⅜ the period at the driving frequency of 40 MHz (FIG. 29) in the actual time base. This stands because the 1/12 the period of the six-time multiplied clock signal TC is actually equal to ⅛ the period of the input clock signal EN. Accordingly, even when the driving frequency is lowered (from 40 MHz to 26.67 MHz), the pulse width and phase length of the signals generated in the signal generator circuit 12A can be maintained in the controllable accuracy.

The output signal of the signal generator circuit 12A has been delayed by two CCD pixels (eight cycles of the input clock signal EN). Accordingly, the output signal of the signal generator circuit 12A can constantly be synchronized with the shift pulse signal SF which is generated from the input clock signal EN and delayed by two CCD pixels (eight cycles of the input clock signal).

Figure 15:
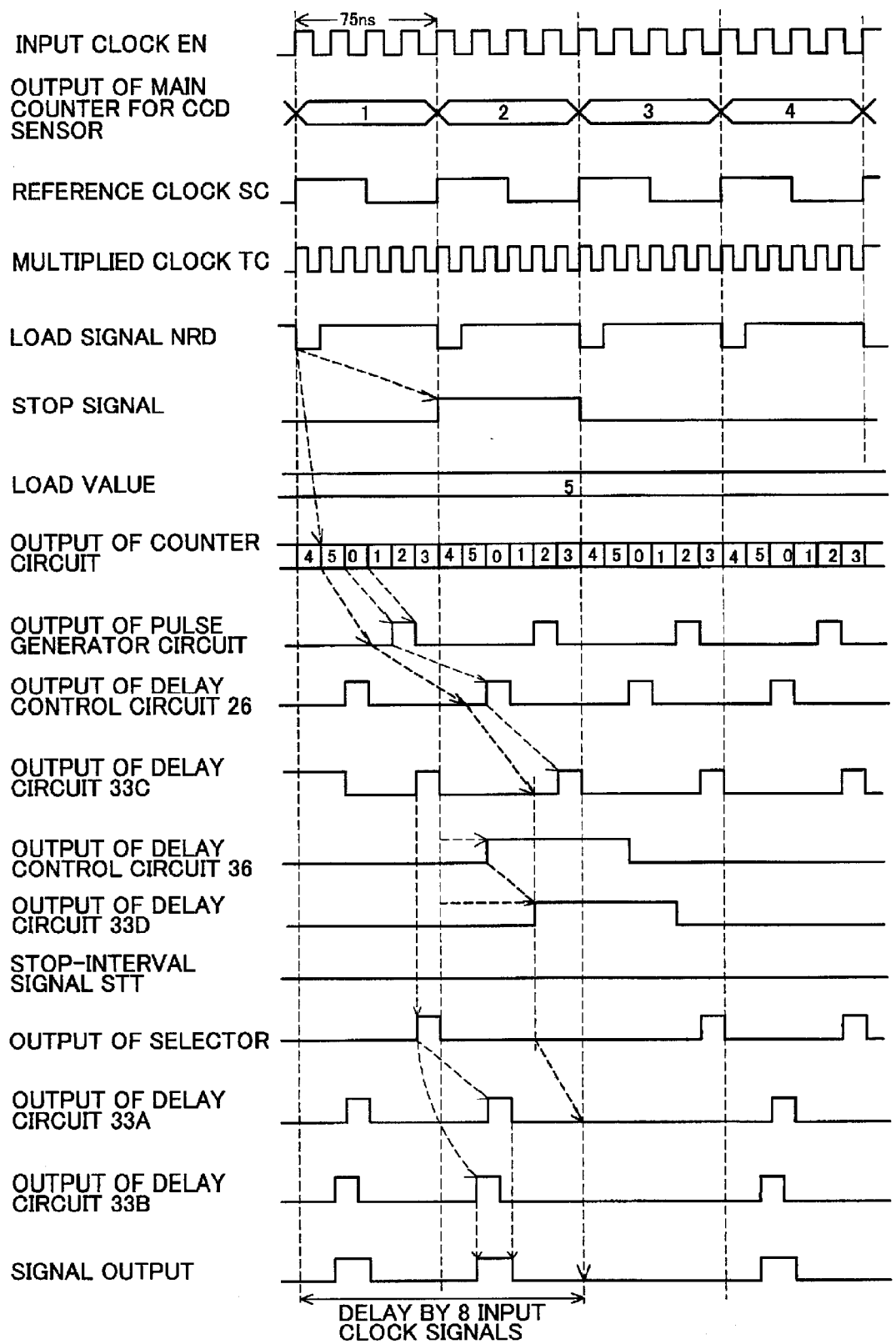
FIG. 15 is a timing chart of the signal generator circuit 12B shown in FIG. 9.
Figure 16:
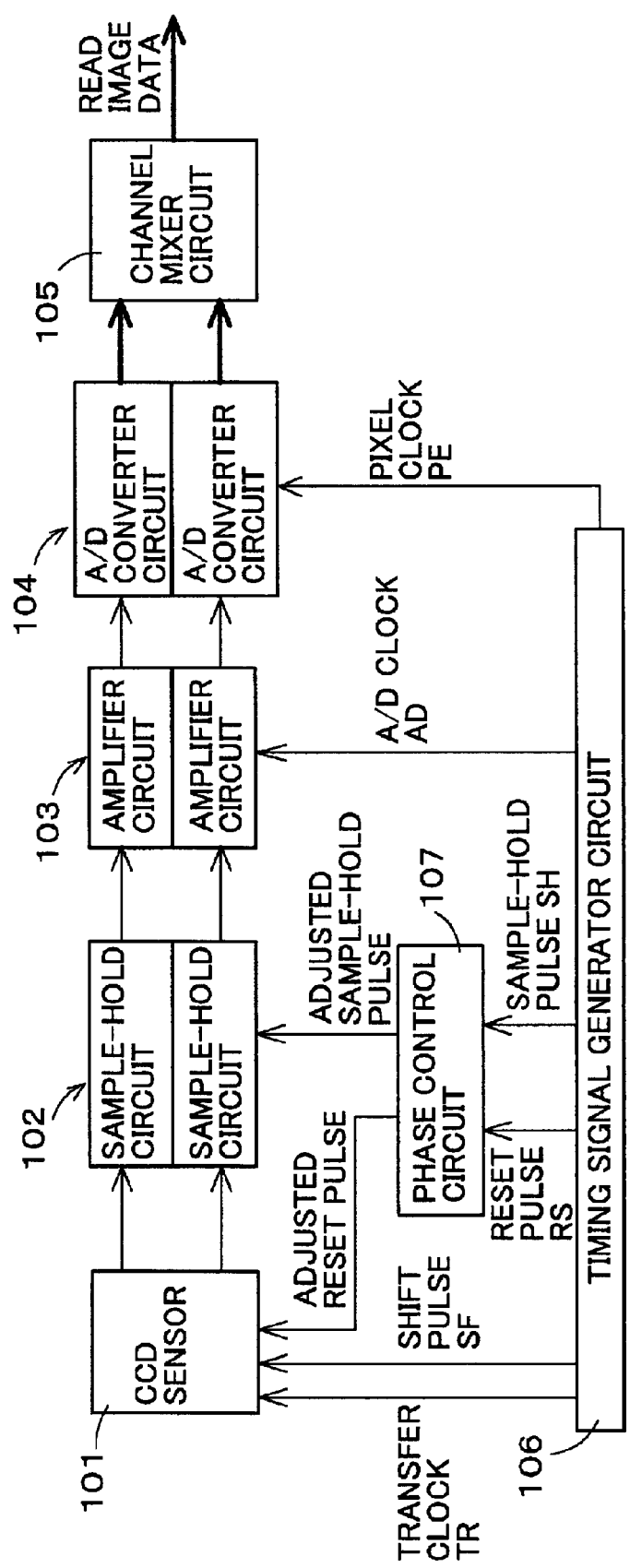
FIG. 16 is a block diagram of a schematic arrangement of a conventional image reading apparatus.

The action of the signal generator circuit 12B is now explained. The action of the signal generator circuit 12B like the signal generator circuit 12A is also classified into four modes depending on the even and odd of m and n at the pulse width of m/12 the period and the phase length of n/12 the period. It is hence assumed for case of the description of the action of the signal generator circuit 12B that the pulse width is 3/12 the period (m being an odd number) and the phase length is 3/12 the period (n being an odd number) as shown in FIG. 15.

As shown in the table of FIG. 6, when the phase length is 3/12 the period, the load value is "5". The output signal of the counter circuit 31 is thus equivalent to the count data "5" delayed by one cycle of the multiplied clock signal TC. As shown in the table of FIG. 7, when the pulse width is 3/12 the period, the comparative value is "1". Accordingly, the pulse generator circuit 32 releases the signal which is at "H" level when the output of the counter circuit 31 is smaller (namely 0) than the comparative value "1" and has been delayed by two cycles of the multiplied clock signal TC.

The output signal of the pulse generator circuit 32 is delayed again by (2×(6−4)=4) cycles of the multiplied clock signal TC in the delay control circuit 26. The output signal of the delay 20 control circuit 26 is further delayed by three cycles of the multiplied clock signal TC in the delay circuit 33C. The output signal of the delay circuit 33C is transferred to the selector 37. Meanwhile, the stop signal TST or RST is delayed by (6−4=2) cycles of the multiplied clock signal TC in the delay control circuit 36. The output signal of the delay control circuit 36 is delayed again by two cycles of the multiplied clock signal TC in the delay circuit 33D. In other words, the stop signal TST or RST is delayed by four cycles of the multiplied clock signal TC. The delayed signal TST or RST is then transmitted to the selector 37. The selector 37 selects and passes the stop-interval signal STT when the output signal of the delay circuit 33D is at "H" level. When the output signal is "L" level, the selector 37 selects and passes the output signal of the delay circuit 33C.

Figure 30:
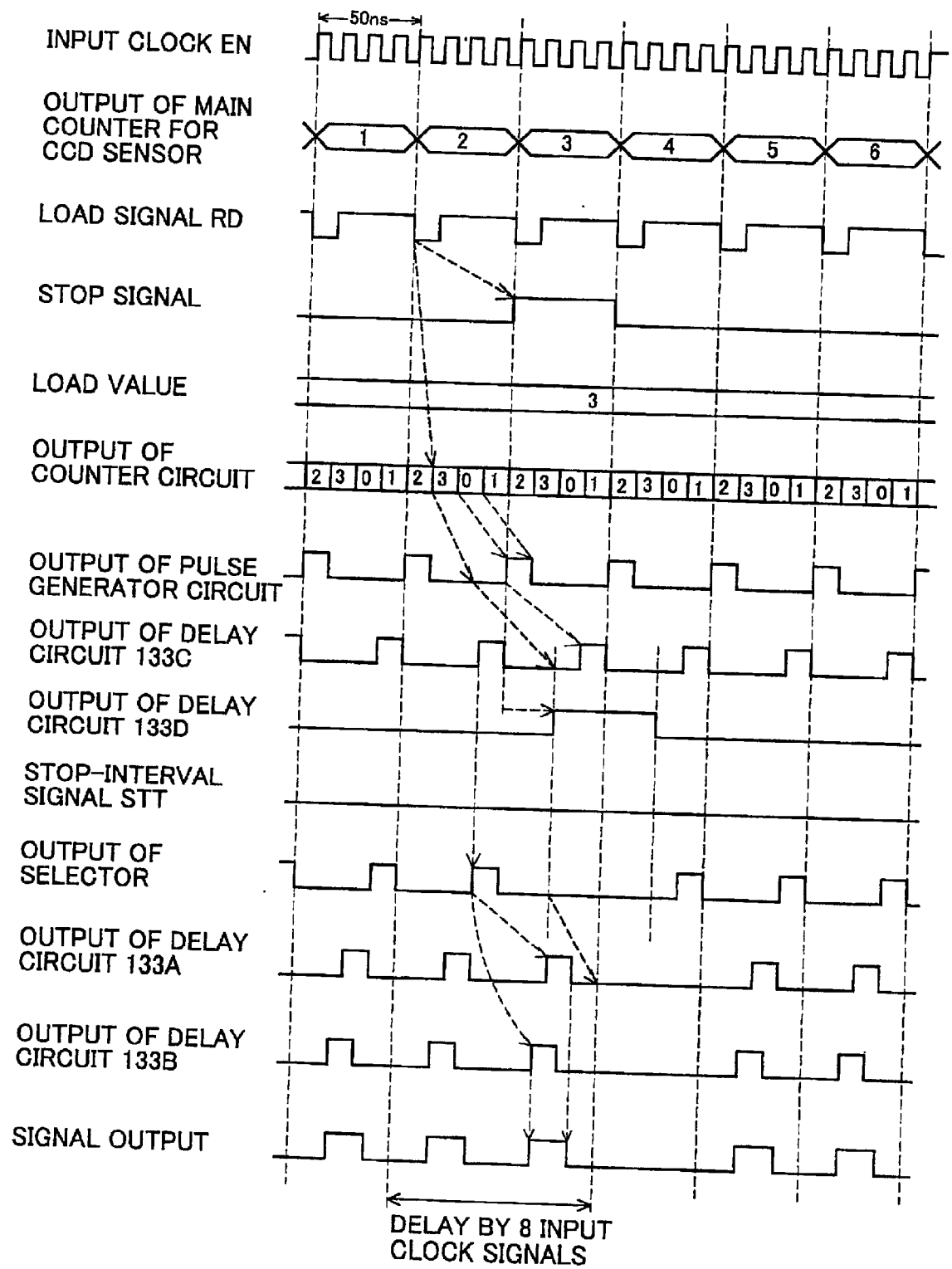
FIG. 30 is a timing chart of the signal generator circuit 112B shown in FIG. 22.

The output signal of the selector 37 is received by the delay circuit 33A. As both m and n are odd numbers at the pulse width of m/12 and the phase length of n/12, the output signal of the selector 37 is delayed by three cycles of the multiplied clock signal TC in the delay circuit 33A. The output signal of the selector 37 is also received by the delay circuit 33B. As n is an odd number at the phase length of n/12, the output signal of the selector 37 is delayed by 2.5 cycles of the multiplied clock signal TC in the delay circuit 33B. The OR gate 24 finally determines the state of the output signal of the signal generator circuit 12B from the two output signals of the delay circuits 33A and 33B. The output signal of the signal generator circuit 12B has a pulse width of 3/12 the period and a phase length of 3/12 the period. Those are equivalent to the pulse width of ⅜ the period and the phase length of ⅜ the period at the driving frequency of 40 MHz (FIG. 30) in the actual time base. This stands because the 1/12 the period of the six-time multiplied clock signal TC is actually equal to ⅛ the period of the input clock signal EN. Accordingly, even when the driving frequency is lowered (from 40 MHz to 26.67 MHz), the pulse width and phase length of the signals generated in the signal generator circuit 12B can be maintained in the controllable accuracy.

The output signal of the signal generator circuit 12B has been delayed by two CCD pixels (eight cycles of the input clock signal EN). Accordingly, the output signal of the signal generator circuit 12B can constantly be synchronized with the shift pulse signal SF which is generated from the input clock signal EN and delayed by two CCD pixels (eight cycles of the input clock signal).

Moreover, the pipeline delay number is maintained equal to two CCD pixels by the delay control circuit 36 regardless of the driving frequency before the transfer clock stop signal TST or the reset pulse stop signal RST is enabled at the outside. This allows the transfer clock stop signal TST or the reset pulse stop signal RST to be synchronized with the shift pulse signal SF. Accordingly, the transfer clock signal NTR or the reset pulse signal NRS generated by the signal generator circuit 12B can precisely be negated in a duration determined by the transfer clock stop signal TST or the reset pulse stop signal RST.

As set forth above, the image reading apparatus of the embodiment of the present invention permits the period of generation of the load signal NRD, the load value of the counter circuits 21 and 31, and the comparative value in the pulse generator circuits 22 and 32 to be changed corresponding to the multiplication rate in the PLL circuit 14. Accordingly, the pulse width and the phase length of the signals generated in the signal generator circuits 12A and 12B can be enhanced in the controllable accuracy by increasing the multiplication rate of the PLL circuit 14. Hence, even if the driving frequency is lowered, the pulse width and the phase length of the signals generated in the signal generator circuits 12A and 12B can favorably be maintained in the controllable accuracy.

Also, the output signals of the signal generator circuits 12A and 12B are delayed by two CCD pixels (eight cycles of the input clock signal EN) in the delay control circuits 26 and 36. This allows the output signals of the signal generator circuits 12A and 12B to be synchronized with the shift pulse signal SF when the driving frequency is changed.

Moreover, the number of the pipeline delay accumulated until the transfer clock stop signal TST or the reset pulse stop signal RST works outside is constantly maintained to two CCD pixels by the delay control circuit 36 regardless of the driving frequency. This permits the transfer clock stop signal TST or the reset pulse stop signal RST to be synchronized with the shift pulse signal SF. Accordingly, the transfer clock signal NTR or the reset pulse signal NRS generated by the signal generator circuit 12B can precisely be negated by the transfer clock stop signal TST or the reset pulse stop signal RST.

It would be understood that the present invention is not limited to the above described embodiment which is illustrative and various modifications and changes may be made without departing from the scope of the present invention. For example, while the CCD sensor in the embodiment is of odd and even signal simultaneous parallel output type, it may be any applicable CCD sensor. The numerals and measurements stipulated in the embodiment are illustrative and of no limitation.

What is claimed is:

1. An image reading apparatus comprising:
   an optoelectric converter device for converting an optical image into an electric signal at the timing of a control signal and a pulse signal;
   a pulse signal generator for generating the pulse signal from an input clock signal;
   a clock signal multiplier for multiplying a clock signal, of which the period corresponds to a period of scanning one pixel on the optoelectric converter device, to generate a multiplied clock signal;
   a load signal generator for generating a load signal from the multiplied clock signal;
   a counter for releasing a count data determined by the multiplied clock signal and the load signal;
   a comparison signal generator for comparing between a pulse width setting value of the control signal and the count data to generate a comparison signal; and
   a control signal generator for generating the control signal from the comparison signal.

2. An image reading apparatus according to claim 1, further comprising a first pipeline delay controller for eliminating a difference between the pipeline delay developed in the generation of the control signal and the pipeline delay developed in the generation of the pulse signal.

3. An image reading apparatus according to claim 1, further comprising:
   a stop signal generator for generating from the pulse signal a stop signal for negating the output of the control signal;
   a signal negator responsive to the stop signal for negating the output of the control signal; and
   a second pipeline delay controller for eliminating a difference between the pipeline delay developed in the generation of the stop signal and the pipeline delay developed in the generation of the control signal.

4. An image reading apparatus comprising:
   a pulse signal generator for generating a pulse signal from an input clock signal;
   an optoelectric converter device for converting reflected light on an original into an electric signal and releasing it as an analog image signal of pixels at intervals of a period determined by the pulse signal;
   a clock multiplier for multiplying a clock signal, of which the period corresponds to a period of scanning one pixel on the optoelectric converter device, to generate a multiplied clock signal;
   a control signal generating means for generating a control signal from the multiplied clock signal; and
   a signal processor responsive to the control signal for processing the analog image signal released from the optoelectric converter device.

5. An image reading apparatus according to claim 4, wherein the signal processor includes sample-hold circuits for sampling and holding the analog image signals.

6. An image reading apparatus according to claim 4, wherein the signal processor includes amplifier circuits for amplifying the analog image signals.

7. An image reading apparatus according to claim 4, wherein the control signal generating means includes:
   a load signal generator for generating a load signal from the multiplied clock signal;
   a counter for releasing a count data determined by the multiplied clock signal and the load signal;
   a comparison signal generator for comparing between a pulse width setting value of the control signal and the count data to generate a comparison signal; and
   a control signal generator for generating the control signal from the comparison signal.

8. An image reading apparatus comprising:
   a CCD sensor;
   means for generating from an input clock signal a shift pulse signal for the CCD sensor;
   means for multiplying a clock signal, of which the period corresponds to a period of scanning one pixel on the CCD sensor, to generate a multiplied clock signal;
   control signal generating means for generating a control signal from the multiplied clock signal; and
   signal processing means responsive to the control signal for processing the analog image signal released from the CCD sensor.

9. An image reading apparatus according to claim 8, wherein the signal processing means includes sample-hold means for sampling and holding the output signals of the CCD sensor.

10. An image reading apparatus according to claim 9, wherein the signal processing means includes amplifying means for amplifying the output signals of the sample-hold means.

11. An image reading apparatus according to claim 8, wherein the control signal carries a transfer clock signal for the CCD sensor.

12. An image reading apparatus according to claim 8, wherein the control signal carries a reset pulse signal for the CCD sensor.

13. An image reading apparatus according to claim 8, wherein the control signal generating means includes:
   means for generating a load signal from the multiplied clock signal;
   means for releasing a count data determined by the multiplied clock signal and the load signal;
   means for comparing between a pulse width setting value of the control signal and the count data to generate a comparison signal; and
   means for generating the control signal from the comparison signal.

* * * * *